(12) United States Patent
Yonezawa et al.

(10) Patent No.: US 12,141,751 B2
(45) Date of Patent: *Nov. 12, 2024

(54) INFORMATION PROCESSING APPARATUS, INFORMATION PROCESSING SYSTEM, CONTROL METHOD, AND PROGRAM

(71) Applicant: NEC Corporation, Tokyo (JP)

(72) Inventors: Yaeko Yonezawa, Tokyo (JP); Kaito Horita, Tokyo (JP); Akira Yajima, Tokyo (JP); Mizuto Sekine, Tokyo (JP); Yoshinori Ehara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,975

(22) Filed: Aug. 1, 2023

(65) Prior Publication Data

US 2024/0020635 A1    Jan. 18, 2024

Related U.S. Application Data

(63) Continuation of application No. 17/986,038, filed on Nov. 14, 2022, now Pat. No. 12,014,324, which is a
(Continued)

(30) Foreign Application Priority Data

Sep. 29, 2017    (JP) ................................. 2017-191790

(51) Int. Cl.
*G06Q 10/087* (2023.01)
*G06F 16/583* (2019.01)
(Continued)

(52) U.S. Cl.
CPC ....... *G06Q 10/087* (2013.01); *G06F 16/5854* (2019.01); *G06F 18/22* (2023.01);
(Continued)

(58) Field of Classification Search
CPC ...... G06Q 10/087; G06V 20/20; G06T 11/60; G06T 19/006

See application file for complete search history.

(56) References Cited

U.S. PATENT DOCUMENTS

| 2011/0310120 | A1* | 12/2011 | Narayanan | .......... | G06F 3/04842 |
| | | | | | 345/633 |
| 2013/0141530 | A1 | 6/2013 | Zavesky | | |

(Continued)

FOREIGN PATENT DOCUMENTS

| JP | 2012-074014 A | 4/2012 |
| JP | 2014/002722 A | 1/2014 |

(Continued)

OTHER PUBLICATIONS

English Translation of WO 2014/087725 A1, 2014 (Year: 2014).*
(Continued)

*Primary Examiner* — Charles Tseng
(74) *Attorney, Agent, or Firm* — Sughrue Mion, PLLC

(57) ABSTRACT

An information processing apparatus (2000) acquires a shelf rack image (12) in which a product shelf rack on which a product is displayed is imaged. The information processing apparatus (2000) performs image analysis on the shelf rack image (12), and generates information (actual display information) relevant to a display situation of the product on a product shelf rack (20). The information processing apparatus (2000) acquires reference display information representing a reference for display of the product on the product shelf rack (20). The information processing apparatus (2000) compares the actual display information generated by performing the image analysis on the shelf rack image (12) with the acquired reference display information, and generates comparison information representing a result.

9 Claims, 19 Drawing Sheets

Related U.S. Application Data continuation of application No. 16/651,762, filed as application No. PCT/JP2018/033600 on Sep. 11, 2018, now Pat. No. 11,531,960.

(51) Int. Cl.

| | | |
|---|---|---|
| *G06F 18/22* | (2023.01) | |
| *G06T 7/70* | (2017.01) | |
| *G06T 19/00* | (2011.01) | |
| *G06V 10/75* | (2022.01) | |
| *G06V 20/20* | (2022.01) | |

(52) U.S. Cl.
CPC ............ *G06T 7/70* (2017.01); *G06T 19/006* (2013.01); *G06V 10/75* (2022.01); *G06V 20/20* (2022.01); *G06T 2200/24* (2013.01); *G06T 2207/30242* (2013.01)

(56) References Cited

U.S. PATENT DOCUMENTS

| | | | |
|---|---|---|---|
| 2013/0147839 A1 | 6/2013 | Fukushima et al. | |
| 2013/0191464 A1* | 7/2013 | Burckart | G06Q 50/01 |
| | | | 707/E17.014 |
| 2013/0300729 A1 | 11/2013 | Grimaud | |
| 2016/0171707 A1* | 6/2016 | Schwartz | G06F 18/22 |
| | | | 382/180 |
| 2017/0351909 A1 | 12/2017 | Kaehler | |
| 2018/0002109 A1 | 1/2018 | Yamashia | |

FOREIGN PATENT DOCUMENTS

| | | |
|---|---|---|
| JP | 5881022 B1 | 3/2016 |
| WO | 2014/067725 A1 | 6/2014 |
| WO | 2016/052383 A1 | 4/2016 |
| WO | 2016/117600 A1 | 7/2016 |

OTHER PUBLICATIONS

International Search Report of PCT/JP2018/036000 dated Nov. 13, 2018 [PCT/ISA/210].
Japanese Office Action for JP Application No. 2019-544538 mailed on Oct. 18, 2022 with English Translation.
US Office Action for U.S. Appl. No. 18/229,022, mailed on Mar. 29, 2024.
US Office Action for U.S. Appl. No. 18/229,324, mailed on Mar. 29, 2024.

* cited by examiner

FIG. 8

| PRODUCT 502 | GROUP 504 | MANUFAC-TURER 506 | POSITION 508 | NUMBER OF FACES 510 | PARALLEL REQUEST 512 | ARRANGEMENT REQUEST 514 | APPLICABLE PERIOD 516 |
|---|---|---|---|---|---|---|---|
| p1 | - | - | FIRST STAGE, THIRD COLUMN | 3 | - | - | 10/01/2017 ~ 10/31/2017 |
| p2 | - | - | SECOND STAGE, FIRST COLUMN | - | - | - | 10/01/2017 ~ 10/15/2017 |
| p3 | - | - | THIRD STAGE | 1 | EXIST | ADJACENT TO PRODUCT p4 | 10/01/2017 ~ 10/31/2017 |
| - | g5 | - | | - | - | - | 10/01/2017 ~ 10/31/2017 |
| - | - | m2 | SECOND STAGE | - | EXIST | - | 10/01/2017 ~ 10/15/2017 |
| ... | ... | ... | ... | ... | ... | ... | ... |

| PRODUCT 602 | GROUP 604 | MANUFAC-TURER 606 | DISPLAY 608 | POSITION 610 | PARALLEL REQUEST 612 | ARRANGEMENT REQUEST 614 | DISPOSITION REQUEST 616 | 600 |
|---|---|---|---|---|---|---|---|---|
| p1 | - | - | MATCH | MATCH | MATCH | - | - | |
| p2 | - | - | NON-MATCH | - | MATCH | - | - | |
| p3 | - | - | MATCH | NON-MATCH | - | MATCH | MATCH | |
| - | g5 | m2 | - | MATCH | - | NON-MATCH | - | |
| - | - | - | - | - | - | MATCH | - | |
| ... | ... | ... | ... | ... | ... | ... | ... | |

INFORMATION PROCESSING APPARATUS, INFORMATION PROCESSING SYSTEM, CONTROL METHOD, AND PROGRAM

This application is a Continuation application of Ser. No. 17/986,038 filed Nov. 14, 2022, which is a Continuation application of Ser. No. 16/651,762, filed Mar. 27, 2020, which issued as U.S. Pat. No. 11,531,960, which is a National Stage of International Application No. PCT/JP2018/033600, filed Sep. 11, 2018, claiming priority to Japanese Patent Application No. 2017-191790, filed Sep. 29, 2017, the contents of all of which are incorporated herein by reference in their entirety.

TECHNICAL FIELD

The present invention relates to management of a product.

BACKGROUND ART

In stores, such as convenience stores and supermarkets, products are displayed on product shelves. An information processing technology has been developed to increase efficiency of an operation of displaying the products. For example, Patent Literature 1 discloses a technology for automatically determining whether or not a relationship between a product placed on a product shelf rack and a shelf label attached to the product shelf rack is correct.

RELATED DOCUMENT

Patent Document

[Patent Document 1] International Publication No. WO 2016/052383

SUMMARY OF THE INVENTION

Technical Problem

There is a case where an operation is performed of prescribing a method for displaying each product on a product shelf rack (a display position, a number of faces, or the like) in advance, and displaying the product according to the prescription. However, even though the operation is performed, there is a case where the product is not actually displayed according to the prescription. Here, a work is performed in which a person or the like who is in charge of a manufacturer visually checks a display situation of the product and checks whether or not the product is correctly displayed. However, in a case where the check is visually performed, there is a problem in that a work load of a worker is large.

The present invention has been made in view of the above problems, and one object of the present invention is to provide a technology which is capable of easily grasping correctness of display of the product.

Solution to Problem

An information processing apparatus according to the present invention includes: 1) an image analysis unit that performs image analysis on a shelf rack image in which a product shelf rack is captured, and generates actual display information representing a display situation of a product on the product shelf rack, and 2) a comparison unit that compares the actual display information with reference display information representing a reference for display of the product on the product shelf rack, and generates comparison information representing a result of the comparison.

An information processing system according to the present invention includes an information processing apparatus and a mobile terminal.

The mobile terminal transmits a shelf rack image, in which a product shelf rack is captured, to the information processing apparatus.

The information processing apparatus includes: 1) an image analysis unit that receives the transmitted shelf rack image, performs image analysis on the shelf rack image, and generates actual display information representing a display situation of the product on the product shelf rack, 2) a comparison unit that compares the actual display information with reference display information representing a reference for display of the product on the product shelf rack, and generates comparison information representing a result of the comparison, and 3) a generation unit that generates a result image representing a product which does not match the reference indicated in the reference display information and a product which matches the reference indicated in the reference display information in a distinguishable aspect using the result of the comparison, and transmits the generated result image to a mobile terminal.

The mobile terminal receives the result image and displays the result image on a display apparatus.

A control method of the present invention is executed by a computer. The control method includes: 1) performing image analysis on a shelf rack image in which a product shelf rack is captured, and generating actual display information representing a display situation of a product on the product shelf rack; and 2) comparing the actual display information with reference display information representing a reference for display of the product on the product shelf rack, and generating comparison information representing a result of the comparison.

A program of the present invention causes a computer to execute respective steps included in the control method of the present invention.

Advantageous Effects of Invention

According to the present invention, there is provided a technology which is capable of easily grasping correctness of display of a product.

BRIEF DESCRIPTION OF THE DRAWINGS

The above-described object and other objects, features, and advantages will be further clarified by preferred example embodiments described below and the accompanying drawings attached thereto.

FIG. 8 is a diagram illustrating a configuration of reference display information.

FIG. 9 is a diagram illustrating comparison information.

DESCRIPTION OF EMBODIMENTS

Figure 1:
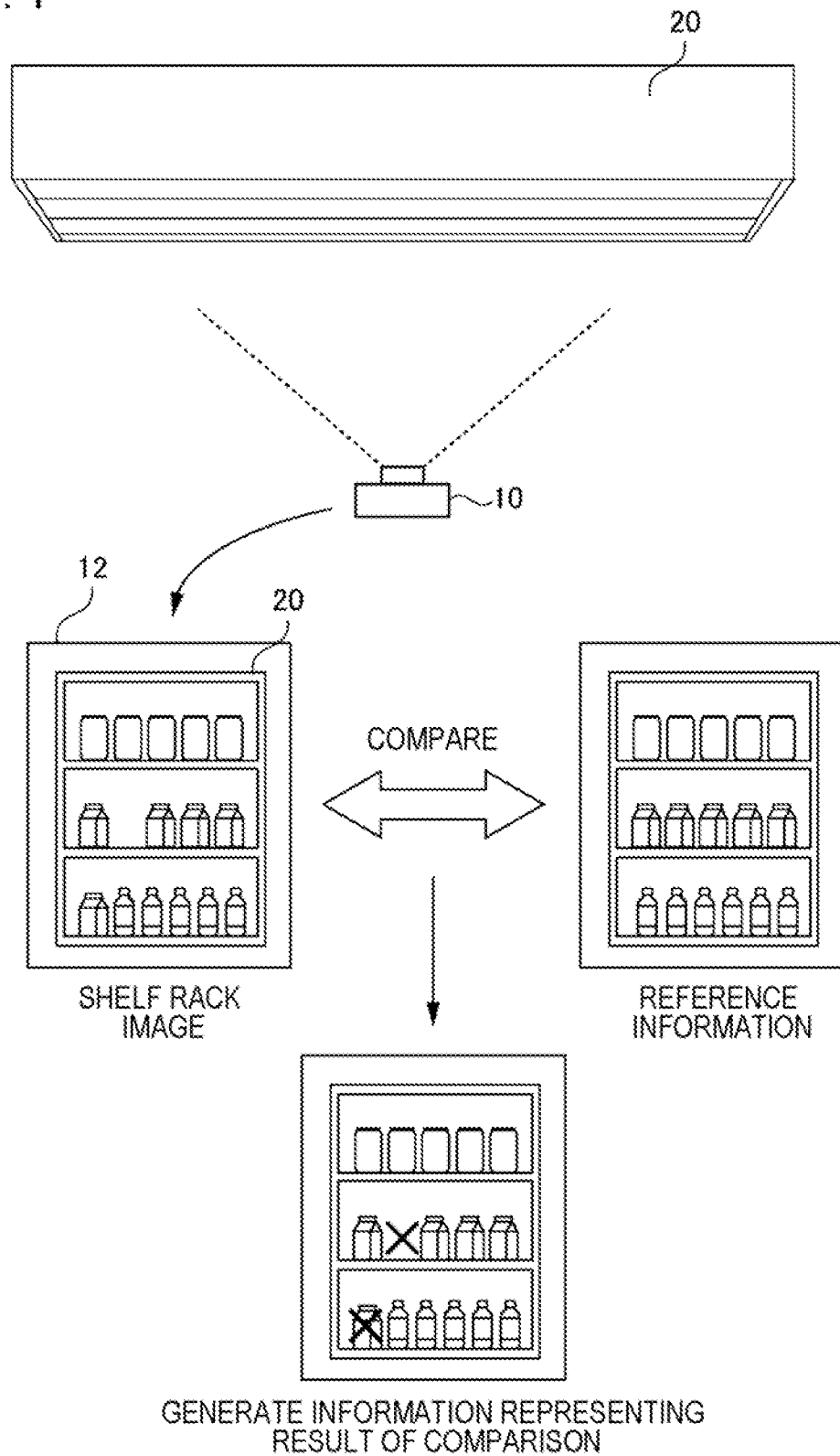
FIG. 1 is a diagram conceptually illustrating an operation of an information processing apparatus according to a first example embodiment.

Hereinafter, example embodiments of the present invention will be described with reference to the accompanying drawings. The same reference numerals are given to the same components throughout the drawings, and the description thereof will not be repeated. Further, unless being particularly specified, in each block diagram, each block represents not a configuration in a hardware unit but a configuration in a functional unit.

First Example Embodiment

<Overview>

Figure 2:
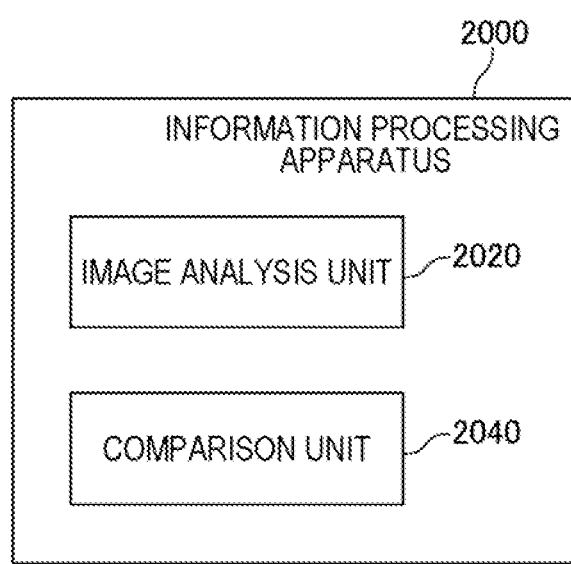
FIG. 2 is a diagram illustrating a functional configuration of the information processing apparatus.

FIG. 1 is a diagram conceptually illustrating an operation of an information processing apparatus (an information processing apparatus 2000 whose configuration is illustrated in FIG. 2) according to a first example embodiment. Here, the operation of the information processing apparatus 2000 described with reference to FIG. 1 is an example for easily understanding the information processing apparatus 2000, and does not limit the operation of the information processing apparatus 2000. Details and variations of the operation of the information processing apparatus 2000 will be described later.

The information processing apparatus 2000 acquires a shelf rack image in which a product shelf rack, on which products are displayed, is captured. In FIG. 1, a shelf rack image 12 is generated as a result that a product shelf rack 20 is imaged by a camera 10. The shelf rack image 12 includes the product shelf rack 20 and the products displayed on the product shelf rack 20. It should be noted that, the product shelf rack, which is a target of the information processing apparatus 2000, may be a place where the products are displayed, and is not limited to a product shelf rack which includes a plurality of stages as illustrated in FIG. 1. For example, in a case where products are stacked flat on a desk, this desk is treated as a product shelf rack.

The information processing apparatus 2000 acquires reference display information representing a reference for display of the product on the product shelf rack 20. For example, the reference display information indicates information relevant to a product to be displayed on the product shelf rack 20, a position of each product on the product shelf rack 20, and the like.

The information processing apparatus 2000 compares an actual display situation represented by the shelf rack image 12 with the reference display information, and generates information representing a result of the comparison. For example, in FIG. 1, information, which indicates that an error occurs in disposition of two products, is generated.

In order to realize the above-described processing, the information processing apparatus 2000 performs image analysis on the shelf rack image 12, and generates information (hereinafter, actual display information) relevant to a display situation of the products on the product shelf rack 20. The actual display information indicates, for example, names of the products displayed on the product shelf rack 20 and positions of the respective products.

The information processing apparatus 2000 compares the actual display information generated by performing image analysis on the shelf rack image 12 with the acquired reference display information, and generates comparison information representing the result.

<Effects>

According to the information processing apparatus 2000 of the present example embodiment, the actual display information generated by performing the image analysis on the shelf rack image 12 is compared with the reference display information, and thus the comparison information representing a result of the comparison is generated. The actual display information is compared with the reference display information as above, and thus it is possible to grasp whether or not a display situation of the products on the product shelf rack 20 matches the reference. Therefore, it is possible to easily grasp whether or not the display situation of the products matches the reference, compared to a case where a person visually checks whether or not the display situation of the products matches the reference.

In addition, in the case where the person visually checks the display situation, there is a problem in that a human error, such as a mistake in vision, occurs. According to the information processing apparatus 2000, it is possible to prevent occurrence of the human error.

<Example of Functional Configuration>

FIG. 2 is a diagram illustrating a functional configuration of the information processing apparatus 2000. The information processing apparatus 2000 includes an image analysis unit 2020 and a comparison unit 2040. The image analysis unit 2020 generates the actual display information by performing the image analysis on the shelf rack image 12. The comparison unit 2040 generates the comparison information by comparing the actual display information with the reference display information.

<Example of Hardware Configuration of Information Processing Apparatus 2000>

Each functional component of the information processing apparatus 2000 may be realized by hardware (for example: a hard-wired electronic circuit) that implements each functional component, or a combination of the hardware and software (for example: a combination of the electronic circuit and a program which controls the electronic circuit). Hereinafter, a case where each functional component of the information processing apparatus 2000 is realized by the combination of the hardware and the software will be further described.

A computer 1000 is a variety of computers. For example, the computer 1000 is a personal computer (PC), a server machine, a tablet terminal, a smartphone, or the like. The computer 1000 may be a dedicated computer designed for realizing the information processing apparatus 2000 or a general-purpose computer.

Figure 3:
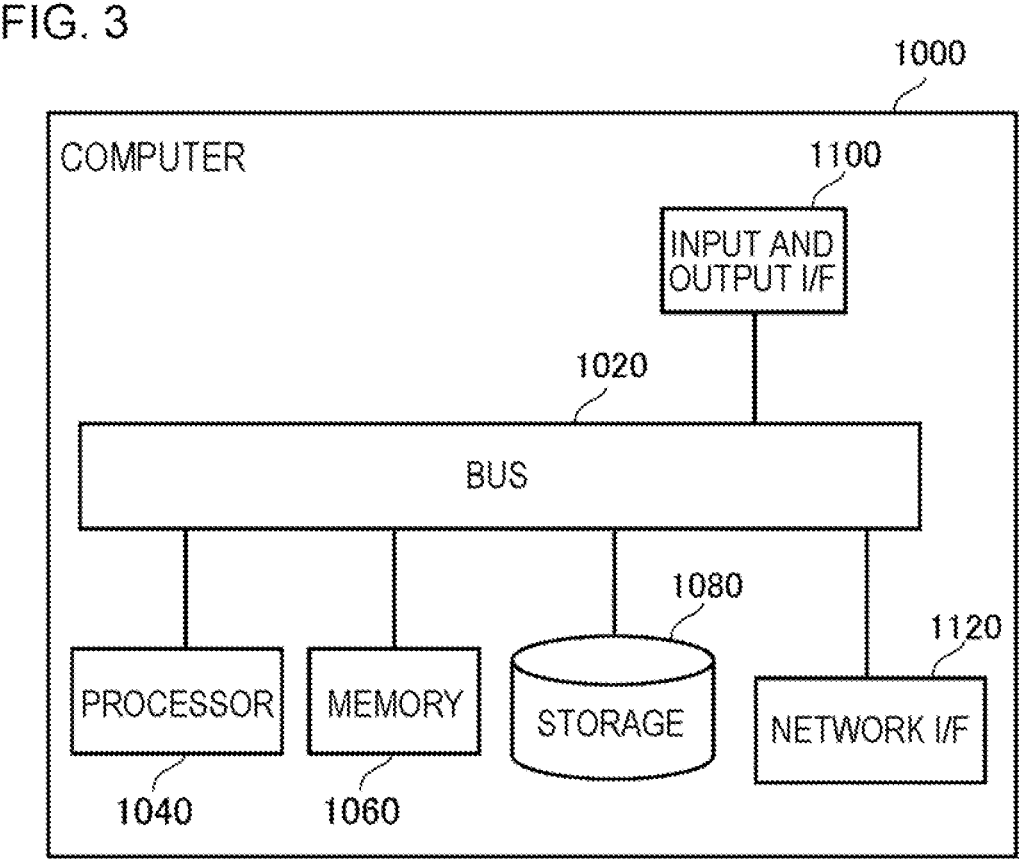
FIG. 3 is a diagram illustrating a configuration of a computer that realizes the information processing apparatus.

FIG. 3 is a diagram illustrating a configuration of the computer 1000 that realizes the information processing apparatus 2000. The computer 1000 includes a bus 1020, a processor 1040, a memory 1060, a storage device 1080, an input and output interface 1100, and a network interface 1120. The bus 1020 is a data transmission path through which the processor 1040, the memory 1060, the storage device 1080, the input and output interface 1100, and the network interface 1120 transmit and receive data to and from each other. However, a method for connecting the processor 1040 and the like to each other is not limited to bus connection. The processor 1040 is a processor configured with a Central Processing Unit (CPU), a Graphics Processing Unit (GPU), or the like. The memory 1060 is a main storage apparatus which is configured with a Random Access Memory (RAM) or the like. The storage device 1080 is an auxiliary storage apparatus configured with a hard disk, a Solid State Drive (SSD), a memory card, a Read Only Memory (ROM), or the like. The input and output interface 1100 is an interface for connecting the computer 1000 to an input and output device. For example, an input device, such as a keyboard, and an output device, such as a display apparatus, are connected to the input and output interface 1100. The network interface 1120 is an interface for connecting the computer 1000 to a network. The communication network is, for example, a Local Area Network (LAN) or a Wide Area Network (WAN). A method for connecting to the network by the network interface 1120 may be wireless connection or wired connection.

The storage device 1080 stores program modules that implement respective functions of the information processing apparatus 2000. The processor 1040 realizes the respective functions corresponding to the program modules by executing the program modules.

<Camera 10>

The camera 10 is an arbitrary imaging device that is capable of performing imaging and generating an image representing a result of the imaging. For example, the camera 10 is a camera provided in a smartphone, a tablet terminal, or the like.

<Example of Usage Pattern of Information Processing Apparatus 2000>

Figure 4:
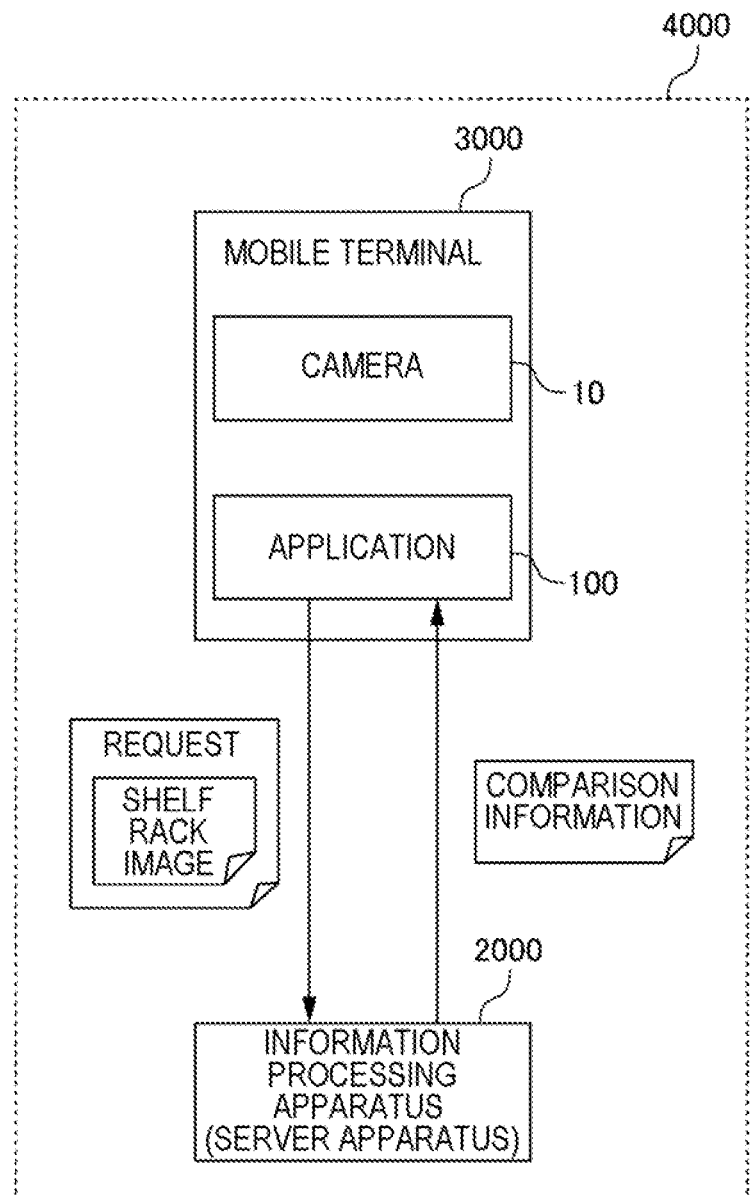
FIG. 4 is a diagram illustrating a usage pattern of the information processing apparatus.

For example, a user of the information processing apparatus 2000 uses the information processing apparatus 2000 via a mobile terminal. The user of the information processing apparatus 2000 is a person, such as a rounder, who performs an operation of checking the display situation of the products. FIG. 4 is a diagram illustrating a usage pattern of the information processing apparatus 2000. In FIG. 4, an information processing system 4000 includes the information processing apparatus 2000 and a mobile terminal 3000. The mobile terminal 3000 is a mobile terminal used by the user. The information processing apparatus 2000 is realized, for example, as a server apparatus.

The mobile terminal 3000 is provided with the camera 10. In addition, an application 100 for using the information processing apparatus 2000 is installed in the mobile terminal 3000 in advance. The application 100 controls the camera 10 to perform imaging. Further, the application 100 transmits a request including the shelf rack image 12 generated by the camera 10 to the information processing apparatus 2000. The information processing apparatus 2000 receives the request from the application.

The information processing apparatus 2000 performs the image analysis on the shelf rack image 12 indicated in the request to generate the actual display information, and compares the actual display information with the reference display information to generate the comparison information. Then, the information processing apparatus 2000 transmits the generated comparison information to the mobile terminal 3000.

It should be noted that, the comparison information is not necessarily transmitted to the mobile terminal 3000. A method for treating the generated comparison information will be described later. Further, the information processing apparatus 2000 is not necessarily used via the mobile terminal 3000.

<Process Flow>

Figure 5:
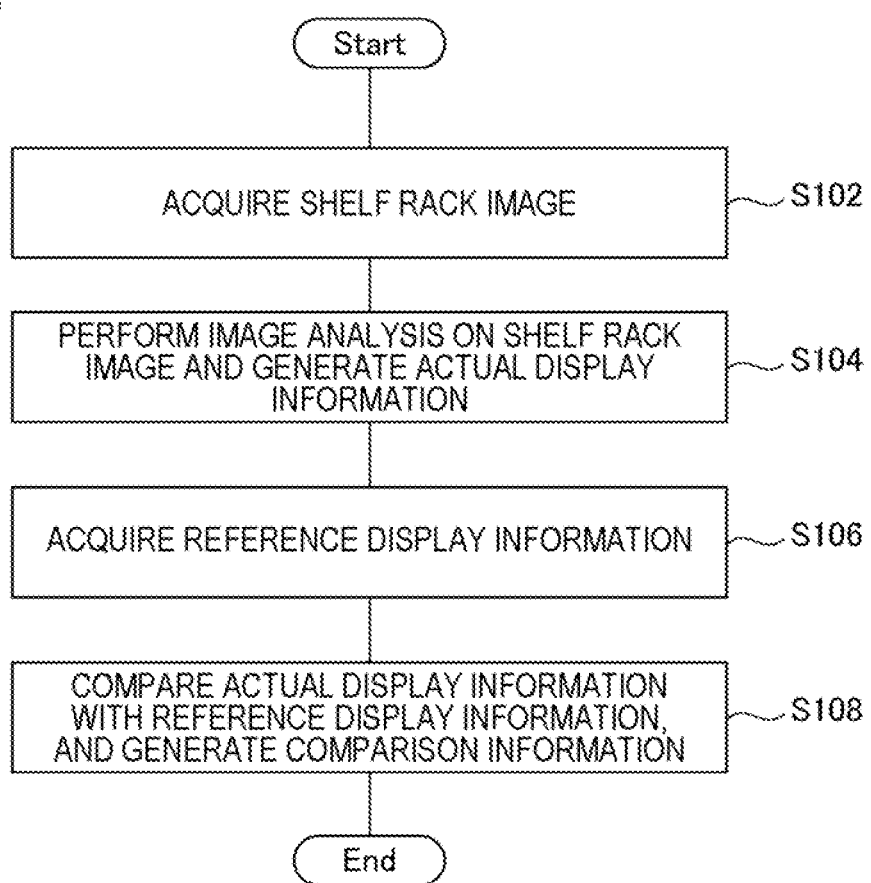
FIG. 5 is a flowchart illustrating a flow of a process executed by the information processing apparatus according to the first example embodiment.

FIG. 5 is a flowchart illustrating a flow of a process executed by the information processing apparatus 2000 according to the first example embodiment. The image analysis unit 2020 acquires the shelf rack image 12 (S102). The image analysis unit 2020 generates the actual display information by performing the image analysis on the shelf rack image 12 (S104). The comparison unit 2040 acquires the reference display information (S106). The comparison unit 2040 generates the comparison information by comparing the actual display information with the reference display information (S108).

It should be noted that, the flow of the process executed by the information processing apparatus 2000 is not limited to the above example. For example, the acquisition of the reference display information may be performed before the actual display information is generated.

Timing at which the information processing apparatus 2000 executes a series of processes illustrated in FIG. 5 is arbitrary. For example, the information processing apparatus 2000 executes the series of processes illustrated in FIG. 5 in response to reception of the above-described request from the application 100. In addition, for example, the information processing apparatus 2000 may receive an input operation of specifying the shelf rack image 12 from the user who operates the input device connected to the information processing apparatus 2000. In this case, the information processing apparatus 2000 executes the series of processes illustrated in FIG. 5 triggered by reception of an input operation from the user.

<Method for Acquiring Shelf Rack Image 12: S102>

A method for acquiring the shelf rack image 12 by the image analysis unit 2020 is arbitrary. For example, the image analysis unit 2020 acquires the shelf rack image 12 included in the request transmitted by the above-described mobile terminal 3000. In addition, for example, in response to the reception of the operation of specifying the shelf rack image 12 by the user, the image analysis unit 2020 may access the storage apparatus, in which the specified shelf rack image 12 is stored, and may acquire the shelf rack image 12.

Here, one product shelf rack 20 may be represented by a plurality of shelf rack images 12. For example, in a case where the product shelf rack 20 is long horizontally, it is possible to image whole parts of the product shelf rack 20 by imaging the product shelf rack 20 a plurality of times while shifting an imaging range of the camera 10 in a horizontal direction.

At this time, in order to ensure that all products displayed on the product shelf rack 20 are imaged, for two shelf rack images 12 including regions adjacent to each other on the product shelf rack 20, it is preferable to image the product shelf rack 20 such that a product on a boundary (ends of the shelf rack images 12) is included in both the shelf rack images 12. For example, it is possible for the information processing apparatus 2000 to grasp the situation of one product shelf rack 20 from the plurality of shelf rack images 12 by treating the plurality of shelf rack images 12 as being combined at parts including common products. This corresponds to, for example, a case where a plurality of pictures are taken such that two pictures partially overlap each other to obtain a panoramic picture.

<Method for Identifying Product Shelf Rack 20 Included in Shelf Rack Image 12>

The information processing apparatus 2000 needs to identify which product shelf rack installed in a store or the like is the product shelf rack 20 included in the acquired shelf rack image 12. For example, when the shelf rack image 12 is acquired, the information processing apparatus 2000 acquires an identifier that identify the product shelf rack 20 included in the shelf rack image 12.

For example, as described above, it is assumed that a request including the shelf rack image 12 is transmitted from the application 100, which operates on the mobile terminal 3000, to the information processing apparatus 2000. In this case, the application 100 includes an identifier of the product shelf rack 20 included in the shelf rack image 12 in the request. For example, the application 100 receives an input for specifying the identifier of the product shelf rack 20 from the user of the mobile terminal 3000, and includes the input identifier in the request.

A method for identifying the product shelf rack 20 included in the shelf rack image 12 is not limited to a method for acquiring the identifier of the product shelf rack 20 together with the shelf rack image 12. For example, the identifier of the product shelf rack 20 is caused to be imaged by the camera 10. Specifically, a mark representing the identifier of the product shelf rack 20 is attached to the product shelf rack 20 in advance. In this manner, the mark representing the identifier of the product shelf rack 20 is included in the shelf rack image 12 generated as a result of imaging the product shelf rack 20 by the camera 10. It is possible for the information processing apparatus 2000 to identify the product shelf rack 20 included in the shelf rack image 12 by performing the image analysis on the mark. For example, it is possible to use a character string representing the identifier of the product shelf rack 20, a QR code (registered trademark), or the like, as the mark.

<Generation of Actual Display Information: S104>

The image analysis unit 2020 generates the actual display information by performing the image analysis on the shelf rack image 12 (S104). Hereinafter, information included in the actual display information will be described.

<<Identification Information of Product>>

The actual display information includes identification information of each product displayed on the product shelf rack 20. For example, the identification information of the product is a product name, an identifier, such as a Japanese Article Number (JAN) code, or the like. Hereinafter, unless otherwise specified, description will be given on the assumption that the product name is used as the identification information of the product. The same applies to the reference display information which will be described later.

For example, the image analysis unit 2020 extracts an image region representing each product from the shelf rack image 12. The image analysis unit 2020 acquires information relevant to the product represented by the image region from a product database by comparing the extracted image region with the image feature of the product registered in the product database. In the product database, it is assumed that, for each product, any of pieces of information, such as at least the product name, the identifier (such as the Japanese Article Number (JAN) code), a name (for example, a brand name) of a group to which the product belongs, a product category to which the product belongs, and a content of the product (for example, 350 ml), a size of the product, a standard price of the product, and manufacturer information is registered. In addition, a manufacturer of the product is an arbitrary manufacturer (for example, a manufacturer or a sales manufacturer) related to the product.

It is possible for the image analysis unit 2020 to identify the product name of each product included in the shelf rack image 12 based on the information acquired from the product database as described above.

<<Group Name>>

In addition, for example, the actual display information indicates a name of a group to which the product belongs. For example, similar to the above-described product name, it is possible to acquire the group, to which the product belongs, from the product database. It is possible to use any information, such as the identifier of the manufacturer, which is capable of identifying the manufacturer, instead of the name of the group. The same applies to the reference display information which will be described later.

<<Manufacturer Name>>

In addition, for example, the actual display information indicates a manufacturer of the product. For example, similar to the above-described product name, it is possible to acquire the manufacturer of the product from the product database. It is possible to use any information, such as an identifier of the manufacturer, which is capable of identifying the manufacturer, instead of a manufacturer name. The same applies to the reference display information which will be described later.

<<Position>>

In addition, for example, the actual display information indicates a position of the product on the product shelf rack 20. The position of the product is indicated by, for example, a combination of a position in a stage direction (for example, the product is positioned on what stage from a top stage) and a position in a column direction (for example, the product is positioned in what column from a leftmost column). Here, it is possible to use an existing technology as a technology for determining the position of each product from an image including the product shelf rack.

In a case where the same type of product (product having the same product name) is disposed at a plurality of positions, the actual display information indicates the plurality of positions for one product.

<<Number of Faces>>

Figure 6:
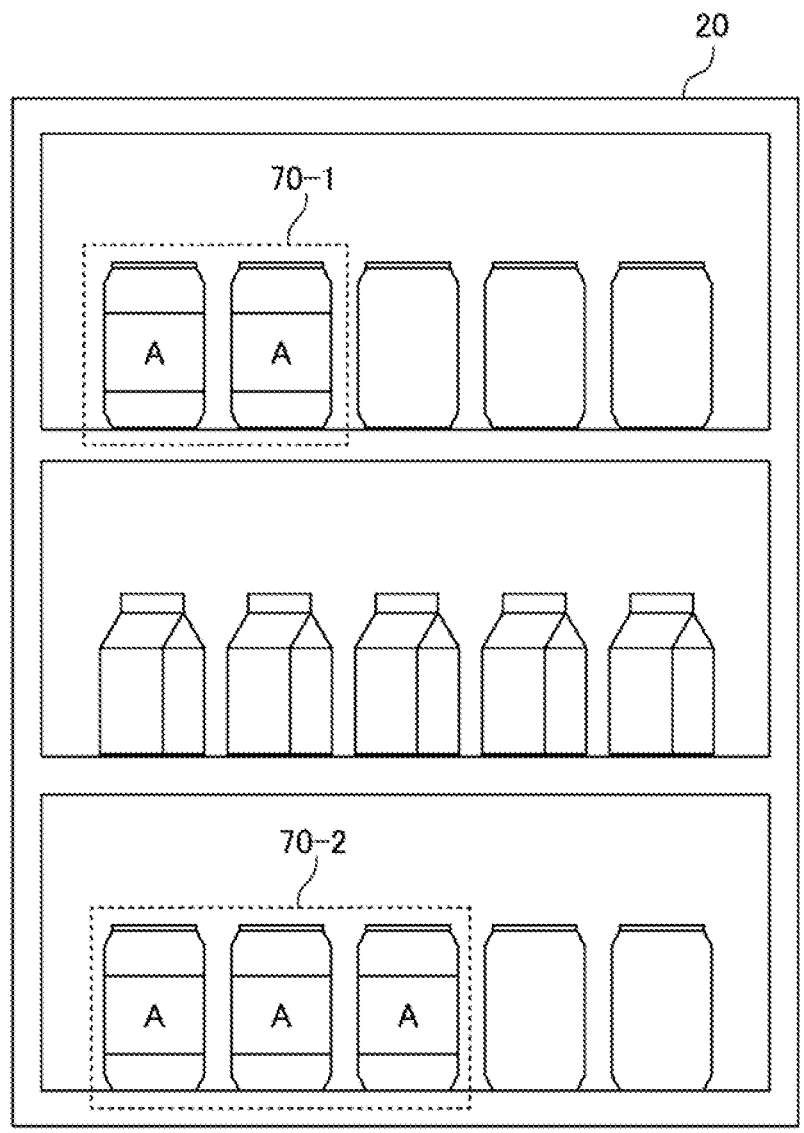
FIG. 6 is a diagram illustrating a case where the same product is separately displayed.

In addition, for example, the actual display information indicates the number of faces of the product. It should be noted that, there may be a case where the same product is separately displayed on the product shelf rack 20. FIG. 6 is a diagram illustrating a case where the same product is separately displayed. In FIG. 6, product A is separately disposed in an area 70-1 and an area 70-2. The number of faces in the area 70-1 is two, and the number of faces in the area is three.

In the case where the same product is disposed in places separated from each other in this way, for example, the actual display information individually indicates the number of faces for the respective places separated from each other. For example, in the case of FIG. 6, the actual display information indicates, as the number of faces of the product A, 2 for the area 70-1, and indicates 3 for the area 70-2.

In addition, for example, in the actual display information, a value acquired by summing the faces in the plurality of places separated from each other may be used as the number of faces of the products. For example, in the case of FIG. 6, the actual display information indicates 5 as the number of faces of the product A.

<<Example of Configuration of Actual Display Information>>

Figure 7:
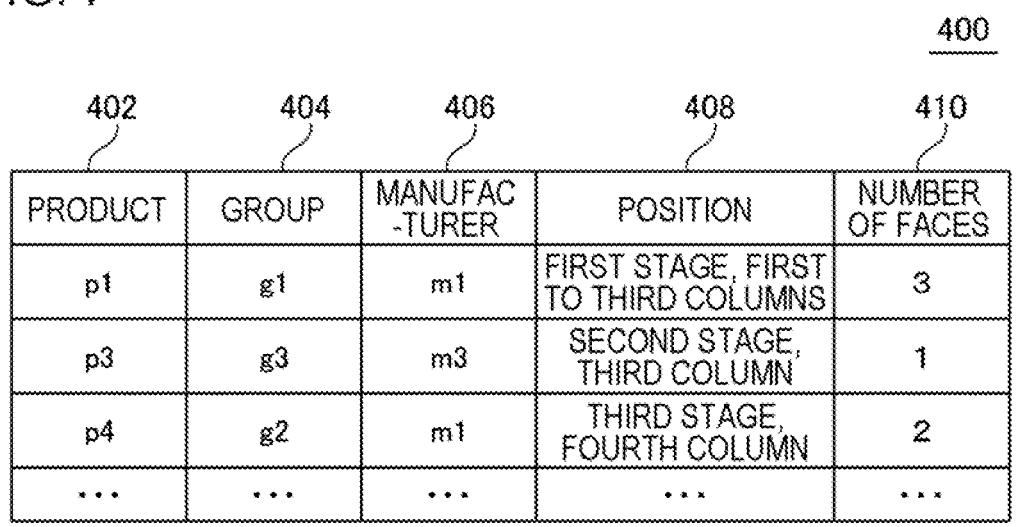
FIG. 7 is a diagram illustrating a configuration of actual display information.

FIG. 7 is a diagram illustrating a configuration of the actual display information. The display information in FIG. 7 is expressed as a table 400. The table 400 includes columns of a product 402, a group 404, a manufacturer 406, a position 408, and the number of faces 410.

Here, information to be included in the actual display information, that is, information to be acquired by performing the image analysis on the shelf rack image 12 may be set in the image analysis unit 2020 in advance, or may be dynamically determined. In the latter case, for example, the image analysis unit 2020 determines the information to be acquired from the shelf rack image 12 based on the acquired reference display information. For example, in a case where the reference display information indicates a product to be placed on the shelf rack and a position where each product should be placed, the information to be acquired from the shelf rack image 12 by the image analysis unit 2020 is the product name and the position of the product.

<Reference Display Information>

As described above, the reference display information indicates the reference for the display of the product on the product shelf rack 20. Hereinafter, information indicated in the reference display information will be described.

<<Identification Information of Product>>

For example, the reference display information indicates identification information (including the product name, the JAN code, or the like) of each product to be displayed on the product shelf rack 20. In the description below, unless otherwise specified, it is assumed that the identification information of the product indicated by the reference display information is the product name.

<<Position>>

In addition, for example, the reference display information indicates a position where each product should be placed on the product shelf rack 20. The position of the product indicated by the reference display information is represented by, for example, the combination of the position in the stage direction and the position in the column direction. In this case, the reference display information indicates that both the position of the product in the stage direction and the position in the column direction should be the positions indicated by the reference display information.

The position of the product indicated by the reference display information may be a range of the position in the column direction or a vertical direction. For example, the reference display information indicates a range such as "second to fourth stages" or "third to fifth columns". In addition, for example, the reference display information may indicate only a position in the stage direction for a certain product. In this case, it is possible to display the product in any column in the stage indicated in the reference display information. Similarly, the reference display information may indicate only the position in the column direction for a certain product.

<<Number of Faces>>

In addition, for example, the reference display information indicates the number of faces of the product. For example, a case where the reference display information indicates 5 as the number of faces of the product A indicates that the product A should be displayed such that the number of faces is 5.

<<Parallel Request>>

In addition, for example, the reference display information may indicate that, for a certain product, the product should be collectively disposed (parallel request). In other words, it means that the product, for which the parallel request is indicated in the reference display information, should not be separately disposed in a plurality of areas, as illustrated in FIG. 6.

Here, a unit, in which the parallel request is specified, is not limited to the product. For example, the parallel request may be specified in units of a product group. In this case, for example, the reference display information indicates the parallel request for products of a determined brand. Each product, which belongs to the brand for which the parallel request is indicated in the reference display information, is required to be disposed at a collective position on the product shelf rack 20.

In addition, for example, the parallel request may be specified in units of a manufacturer. In this case, for example, the reference display information indicates the parallel request for a product of a determined manufacturer. Each product of the manufacturer, for which the parallel request is indicated in the reference display information, is required to be disposed at the collective position on the product shelf rack 20.

In addition, for example, the parallel request may be specified by the content of the product. In this case, for example, the reference display information indicates the parallel request for a product having a determined content. Each product, for which the parallel request is indicated in the reference display information and which has a determined content, is required to be disposed at the collective position on the product shelf rack 20. More specifically, for example, in a case where the determined content indicates 500 ml, a product having a content of 500 ml, for example, a canned beer of 500 ml sold by the manufacturer is disposed at a collective position on the product shelf rack 20.

<<Arrangement Request>>

In addition, for example, the reference display information may indicate a request (hereinafter, an arrangement request) relevant to a disposition relationship among a plurality of products. For example, the arrangement request is a request to "dispose the product A and a product B to be adjacent to each other". For example, it is assumed that the reference display information indicates the arrangement request without indicating the positions for the product A and the product B. In this case, the product A and the product B may be disposed at arbitrary positions on the product shelf rack 20 as long as they are adjacent to each other.

In contrast, the arrangement request may indicate that multiple products should be separately placed. For example, it is conceivable to define an arrangement request such as "the product A and the product B are disposed in different stages".

Here, a unit, in which the arrangement request is specified, is not limited to the product. For example, the arrangement request may be specified in units of a product group. For example, there is a request to "dispose a group D and a group E to be adjacent to each other". In this case, it is necessary that, in the product shelf rack 20, a region where the products belonging to the group D are disposed and a region where the products belonging to the group E are disposed are adjacent to each other. It should be noted that, similar to the product arrangement request, the group arrangement request may indicate that a plurality of groups should be separately disposed.

In addition, for example, the arrangement request may be specified in units of a manufacturer. In this case, for example, there is a request to "dispose a product of a manufacturer X and a product of a manufacturer Y to be adjacent to each other". In this case, it is necessary that, in the product shelf rack 20, a region where the product of the manufacturer X and a region where the product of the manufacturer Y are disposed to be adjacent to each other. It should be noted that, similar to the product arrangement request, the manufacturer arrangement request may indicate that the products of a plurality of manufacturers should be disposed to be separated from each other.

<<Applicable Period>>

In addition, for example, the reference display information may indicate, for each product, a period during which the reference display information is applied to the product. For example, a case where the reference display information indicates an applicable period of "Oct. 1, 2017 to Oct. 31, 2017" for the product A means that it is necessary to observe information (for example, the position) for the product A indicated by the reference display information in the applicable period. The applicable period may be defined for a group of the products or the entire reference display information, instead of each product.

<<Example of Configuration of Reference Display Information>>

FIG. 8 is a diagram illustrating a configuration of the reference display information. A table in FIG. 8 is expressed as a table 500. The table 500 includes columns of a product 502, a group 504, a manufacturer 506, a position 508, the number of faces 510, a parallel request 512, an arrangement request 514, and an applicable period 516.

Data is indicated in any one of the product 502, the group 504, and the manufacturer 506. A record, in which the product name is indicated in the product 502, indicates a reference relevant to the product having the name. A record, in which the group name is indicated in the group 504, indicates a reference relevant to the group having the name. A record, in which the manufacturer name is indicated in the manufacturer 506, indicates a reference relevant to the manufacturer having the name. A product to be disposed on the product shelf rack 20 is a product whose product name is indicated in the product 502. It should be noted that, the table 500 described with reference to FIG. 8 is not limited to the above-described configuration. For example, the table 500 may further include at least one of the identifier, the product category, the content, and the size of the product.

The reference display information may be information relevant to all products placed on the product shelf rack 20 or information relevant to some products. In the latter case, for example, the reference display information indicates a reference for display of a product of the determined manufacturer. In this case, the reference display information for one product shelf rack 20 is prepared for each manufacturer. Therefore, the reference display information in FIG. 8 may not include the manufacturer 506.

In a case where the reference display information is prepared for each manufacturer, the information processing apparatus 2000 may compare only the reference display information of the determined manufacturer with the actual display information. In this case, for example, the information processing apparatus 2000 acquires information (for example, a manufacturer name) for determining the reference display information which is a target of the comparison. This information is input by the user of the information processing apparatus 2000. For example, the user performs an input operation of specifying the manufacturer name with respect to the above-described mobile terminal 3000. The application 100 transmits the manufacturer name, which is input by the user, to be included in the above-described request. The information processing apparatus 2000 receives the request, and thus it is possible to grasp the manufacturer name specified by the user. In addition, for example, the user may input a manufacturer name by operating an input device connected to the information processing apparatus 2000.

<Method for Acquiring Reference Display Information: S106>

There are various methods for acquiring the reference display information by the information processing apparatus 2000. For example, the reference display information is stored in advance in the storage apparatus which is accessible from the information processing apparatus 2000. In this case, the information processing apparatus 2000 acquires the reference display information by accessing the storage apparatus. At this time, the information processing apparatus 2000 acquires the reference display information relevant to the product shelf rack 20 by using the identifier of the product shelf rack 20 which is a target of processing. In a case where the reference display information of the determined manufacturer is acquired, the information processing apparatus 2000 acquires the reference display information of the determined manufacturer by using the manufacturer name or the like which is acquired using the above-described method.

In addition, for example, the reference display information may be stored in the storage apparatus included in the management server. In this case, for example, the information processing apparatus 2000 acquires the reference display information of the product shelf rack which is determined by the identifier, by transmitting a request including the identifier of the product shelf rack 20 to the management server. In a case where the reference display information of the determined manufacturer is acquired, the identifier of the manufacturer (for example, the manufacturer name) is also included in this request.

<Comparison of Actual Display Information with Reference Display Information: S108>

The comparison unit 2040 compares the actual display information with the reference display information, and generates comparison information representing a result of the comparison (S108). For this reason, the comparison unit 2040 determines whether or not each reference (each reference for the product, the group of products, or the manufacturer) indicated by the reference display information is satisfied in the actual display information.

For example, the comparison unit 2040 determines whether or not each product, which is indicated in the reference display information, is indicated in the actual display information by comparing the product name (identification information of the product) indicated in the actual display information with the product name (identification information of the product) indicated in the reference display information.

In addition, for example, in a case where the reference display information indicates a position of a certain product, the comparison unit 2040 determines whether or not the position of the product in the actual display information matches the position indicated in the reference display information.

In addition, for example, in a case where the reference display information indicates the number of faces of a certain product, the comparison unit 2040 determines whether or not the number of faces of the product indicated by the actual display information matches the number of faces indicated in the reference display information. Here, the number of faces of the product indicated by the actual display information may be larger than the number of faces of the product indicated by the reference display information. For example, a situation may arise in which, for a product that should have three faces, the number of faces is five in an actual display situation. In this way, in a case where the number of faces of the product in the actual display situation exceeds the number of faces indicated by the reference display information, the product may be determined that the number of faces matches the reference or does not match the reference. Information for determining a result of the determination on either matching or non-matching is included in, for example, the reference display information.

In a case where the reference display information indicates the parallel request or the arrangement request, the comparison unit 2040 determines whether or not the parallel request or the arrangement request is satisfied on the basis of the position of each product indicated in the actual display information. For example, it is assumed that the reference display information indicates the parallel request representing that products, which belong to a certain product group, should be collectively placed. In this case, the comparison unit 2040 determines whether or not the products of the product group are collectively placed on the basis of the positions of the respective products, which belong to the product group, in the actual display information. Specifically, in a case where the positions of the respective products, which belong to the product group, are continuous in the stage direction or in the column direction, the products are collectively placed, and thus the parallel request is satisfied. Further, for example, it is assumed that the reference display information indicates the arrangement request representing that a plurality of certain products should be placed adjacent to each other. In this case, the comparison unit 2040 determines whether or not the arrangement request is satisfied by determining whether or not the positions of the plurality of products are adjacent in the actual display information.

In the case where the reference display information indicates the applicable period, the comparison unit 2040 compares only the products whose applicable period includes a current time in the reference display information, among the products indicated in the actual display information, with the reference display information.

FIG. 9 is a diagram illustrating the comparison information. A table in FIG. 9 is referred to as a table 600. The table 600 includes columns of a product 602, a group 604, a manufacturer 606, a display 608, a position 610, the number of faces 612, a parallel request 614, and an arrangement request 616. A record, in which the product name is indicated in the product 602, indicates a result of the comparison of the reference of the product having the product name indicated in the reference display information with the actual display information. A record, in which the group name is indicated in the group 604, indicates a result of the comparison of the reference of the product group of the group name indicated in the reference display information with the actual display information. A record, in which the manufacturer name is indicated in the manufacturer 606, indicates a result of the comparison of the reference of the product of the manufacturer name indicated in the reference display information with the actual display information.

Each of the display 608, the position 610, the number of faces 612, the parallel request 614, and the arrangement request 616 indicates whether or not the actual display information matches the reference. For example, in the table 600, a case where the display 608 of a record of a certain product indicates "non-match" represents a case where the name of the product is indicated in the reference display information, and, on the other hand, the name of the product is not indicated in the actual display information. That is, the case indicates that a product to be displayed on the product shelf rack 20 is not displayed. In addition, for example, in the table 600, a case where the position 610 of the record of the certain product is "non-match" represents a case where the position of the product indicated in the actual display information does not match the reference indicated in the reference display information.

There are various methods for handling the comparison information. For example, the comparison unit 2040 stores the comparison information in the storage apparatus. In addition, for example, the comparison unit 2040 may generate image data or the like representing the result of the comparison using the comparison information, as described in an example embodiment which will be described later.

<<Restriction of Comparison Items>>

It is assumed that the reference display information indicates reference for a plurality of items such as the product name of the product to be displayed on the product shelf rack 20, the position of each product, and the number of faces of each product. In this case, the comparison unit 2040 may compare the actual display information with the reference display information for all items indicated in the reference display information, or may compare the actual display information with the reference display information for some items. In the latter case, for example, an item to be compared is specified by an input operation performed by the user.

Further, the comparison unit 2040 may compare the actual display information with the reference display information only for some products. For example, the comparison unit 2040 compares the actual display information and the reference display information only for the product of the determined manufacturer. In this case, for example, the determined manufacturer is specified by an input operation performed by the user.

A method for comparing the actual display information with the reference display information only for the determined manufacturer is not limited to the above-described method. For example, as described above, the reference display information may be prepared for each manufacturer, and only the reference display information of the determined manufacturer may be acquired by the comparison unit 2040.

<<Computation of Match Rate>>

The comparison unit 2040 may compute an index value representing the degree in which the display situation of the product represented by the actual display information matches the reference indicated in the reference display information. The index value is referred to as a match rate. For example, it is possible to define the match rate as a value acquired by dividing "the number of products, which are displayed on the product shelf rack 20 and which matches the reference indicated in the reference display information" by "a total number of products which should be displayed on the product shelf rack 20". The following Equation (1) represents the definition. Here, "a certain product matches the reference" means that the information of the product indicated by the actual display information matches all the references (the position, the number of faces, and the like) indicated by the reference display information.

$$\text{match rate} = \frac{\text{the number of products which match reference}}{\text{the number of products which should be displayed on shelf}} \quad (1)$$

Further, the match rate may be computed not only for the individual product shelf rack 20 but also for an entire store. In this case, the match rate of the entire store is computed using the comparison information generated for each of the plurality of product shelves 20. Specifically, it is possible to define the match rate as a value acquired by dividing "the number of products which are displayed in the store and which match the reference indicated in the reference display information" by "the total number of products to be displayed in the store". The following Equation (2) expresses the definition.

$$\text{match rate} = \frac{\text{the number of products which match reference}}{\text{the number of products which should be displayed in store}} \quad (2)$$

Hereinafter, the match rate (Equation (1)) computed for each shelf rack is referred to as a "match rate for each shelf rack", and the match rate (Equation (2)) computed for the entire store is referred to as a "match rate for each store". For example, in a case where one company manages a plurality of stores, it is possible to use the match rate for each store as one of the indexes for grasping an operation situation of each store. It can be said that, in a store having a high match rate for each store, the products are appropriately displayed according to the reference. On the other hand, there is a possibility that, in a store having a low match rate for each store, the products are not appropriately displayed.

Here, an opportunity, in which the information processing apparatus 2000 computes the match rate for each store, is arbitrary. For example, the information processing apparatus 2000 uses a fact that the comparison information is generated for all the product shelves 20 existing in the store as a trigger and computes the match rate for each store for the store.

It should be noted that, the match rate for each shelf rack and the match rate for each store may be computed not for all the displayed products but only for the products of the determined manufacturer. For example, it is assumed that the match rate for each shelf rack is computed for a certain manufacturer. In this case, the comparison unit 2040 computes a value acquired by dividing "the number of products that match the reference indicated in the reference display information among the products, which are placed on the product shelf rack 20, of the manufacturer" by "the total number of products of the manufacturer to be displayed on the product shelf rack 20" as the match rate for each shelf rack for the manufacturer. In addition, the comparison unit 2040 computes a value acquired by dividing the "number of products that match the reference indicated in the reference display information among the products of the manufacturer placed in the store" by "the number of products of the manufacturer to be displayed in the store" as the match rate for each store for the manufacturer.

In a case where, for the determined manufacturer, the match rate for each shelf rack or the match rate for each store is computed, the information processing apparatus 2000 acquires identification information (the manufacturer name, the manufacturer identifier, and the like) for determining the manufacturer. The identification information of the manufacturer is included in, for example, a request transmitted from the mobile terminal 3000.

<<Alert Using Match Rate>>

As described above, the information processing apparatus 2000 acquires the identifier of the product shelf rack 20 in order to identify the product shelf rack 20 included in the shelf rack image 12. Further, the information processing apparatus 2000 acquires the reference display information for the product shelf rack 20 determined by the identifier. Here, in a case where the information processing apparatus 2000 acquires an identifier of the product shelf rack 20, which is different from the product shelf rack 20 included in the shelf rack image 12, the information processing apparatus 2000 compares the display situation of the product shelf rack 20 included in the shelf rack image 12 with the reference display information for the different product shelf rack 20. Therefore, there is a high probability that the match rate for each shelf rack, which is computed in this case, is low.

Therefore, the information processing apparatus 2000 may be configured to determine whether or not the match rate for each shelf rack, which is computed by the comparison unit 2040, is equal to or less than a predetermined value, and to output an alert having a gist that there is a possibility that the identifier of the product shelf rack 20 is incorrect in a case where the match rate for each shelf rack is equal to or less than the predetermined value.

For example, it is assumed that the information processing apparatus 2000 receives a request, which includes the shelf rack image 12 and the identifier of the product shelf rack 20, from the mobile terminal 3000. In this case, in a case where the computed match rate for each shelf rack is equal to or larger than the predetermined value, the information processing apparatus 2000 transmits a message representing the above-described alert as a response with respect to the request. It is possible for the user, who receives the message, of the mobile terminal 3000 to take a measure of, for example, correcting transmission of the request by specifying the identifier of the product shelf rack 20.

Although a case where the alert is output in a situation in which there is a possibility that the identifier of the product shelf rack 20 is incorrect is exemplified in the above, the situation in which the alert is output is not limited to the situation. For example, in a case where at least any one of the match rate for each shelf rack and the match rate for each store, which are computed by the comparison unit 2040, is used and the match rate does not satisfy a predetermined condition, the information processing apparatus 2000 may output an alert representing a gist that an appropriate display according to the reference is not performed. For example, the predetermined condition is a condition that the match rate is equal to or larger than the predetermined value.

Second Example Embodiment

Figure 10:
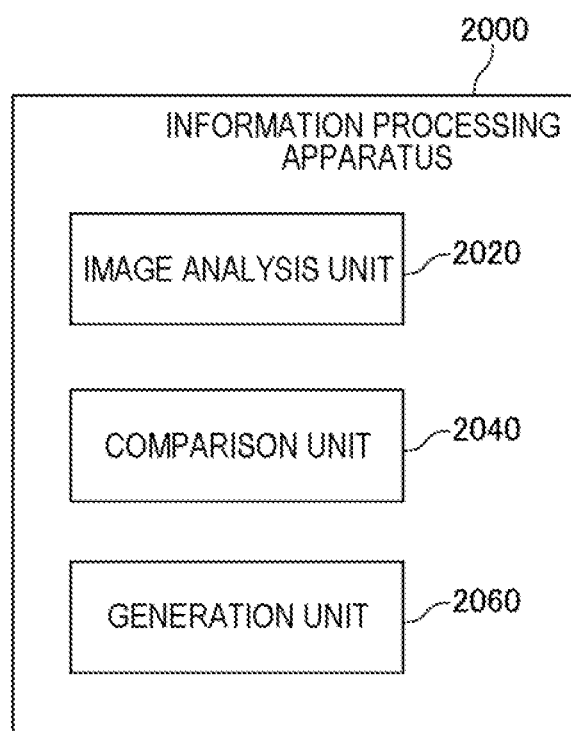
FIG. 10 is a block diagram illustrating a functional configuration of an information processing apparatus according to a second example embodiment.

FIG. 10 is a block diagram illustrating a functional configuration of an information processing apparatus 2000 according to a second example embodiment. Except for the items described below, the information processing apparatus 2000 according to the second example embodiment has the same functions as the information processing apparatus 2000 according to the first example embodiment.

The information processing apparatus 2000 according to the second example embodiment includes a generation unit 2060. The generation unit 2060 generates a result image for the product shelf rack 20 using the comparison information generated for the product shelf rack 20. The result image of the product shelf rack 20 is image data represented products which do not match the reference indicated in the reference display information and products that match the reference indicated in the reference display information in a distinguishable aspect. The result image may be stored in the storage apparatus as an image file, or may be displayed on the display apparatus as screen data.

According to the information processing apparatus 2000 of the example embodiment, a result, which is acquired by comparing a display situation of the products on the product shelf rack 20 with the reference display information, is graphically represented in a form of the result image. Therefore, it is possible to intuitively and easily recognize a difference between the display situation of the products on the product shelf rack 20 and the reference for the display.

<Display Apparatus>

It is possible to use any display apparatus as the display apparatus on which the result image is displayed. For example, the display apparatus includes a display apparatus connected to the information processing apparatus 2000 or a display apparatus of the mobile terminal 3000. In addition, for example, the display apparatus may be a terminal installed in a staff room of a store where the product shelf rack 20 is installed, or a display apparatus connected to a terminal installed in an office of a company that manages the store. In addition, for example, it is assumed that a rounder or the like of a certain manufacturer uses the information processing apparatus 2000 in order to check whether or not a product of the manufacturer is correctly displayed on the product shelf rack 20. In this case, the display apparatus on which the result image is displayed may be a display apparatus connected to the terminal installed in the office or the like of the manufacturer. The terminal installed in the staff room or the office is, for example, a PC.

Here, in a case where the display apparatus, on which the result image is displayed, is not connected to the information processing apparatus 2000, the information processing apparatus 2000 transmits the result image to the terminal to which the display apparatus is connected. Therefore, it is necessary for the information processing apparatus 2000 to be able to determine a transmission destination of the result image.

There are various methods for determining the transmission destination of the result image. For example, information for determining the transmission destination of the result image is stored in the storage apparatus, which is accessible from the information processing apparatus 2000, in advance. In this case, the information processing apparatus 2000 determines the transmission destination of the result image by accessing the storage apparatus.

In addition, for example, in a case where the information processing apparatus 2000 performs a process according to the request transmitted from the mobile terminal 3000, the information processing apparatus 2000 transmits the result image to the transmission source of the request. The transmission destination of the result image may be included in the request. In this case, the information processing apparatus 2000 transmits the result image to the transmission destination indicated in the request.

<Result Image>

Specific content of the result image is various. Hereinafter, variations in the result image will be illustrated.

Figure 11:
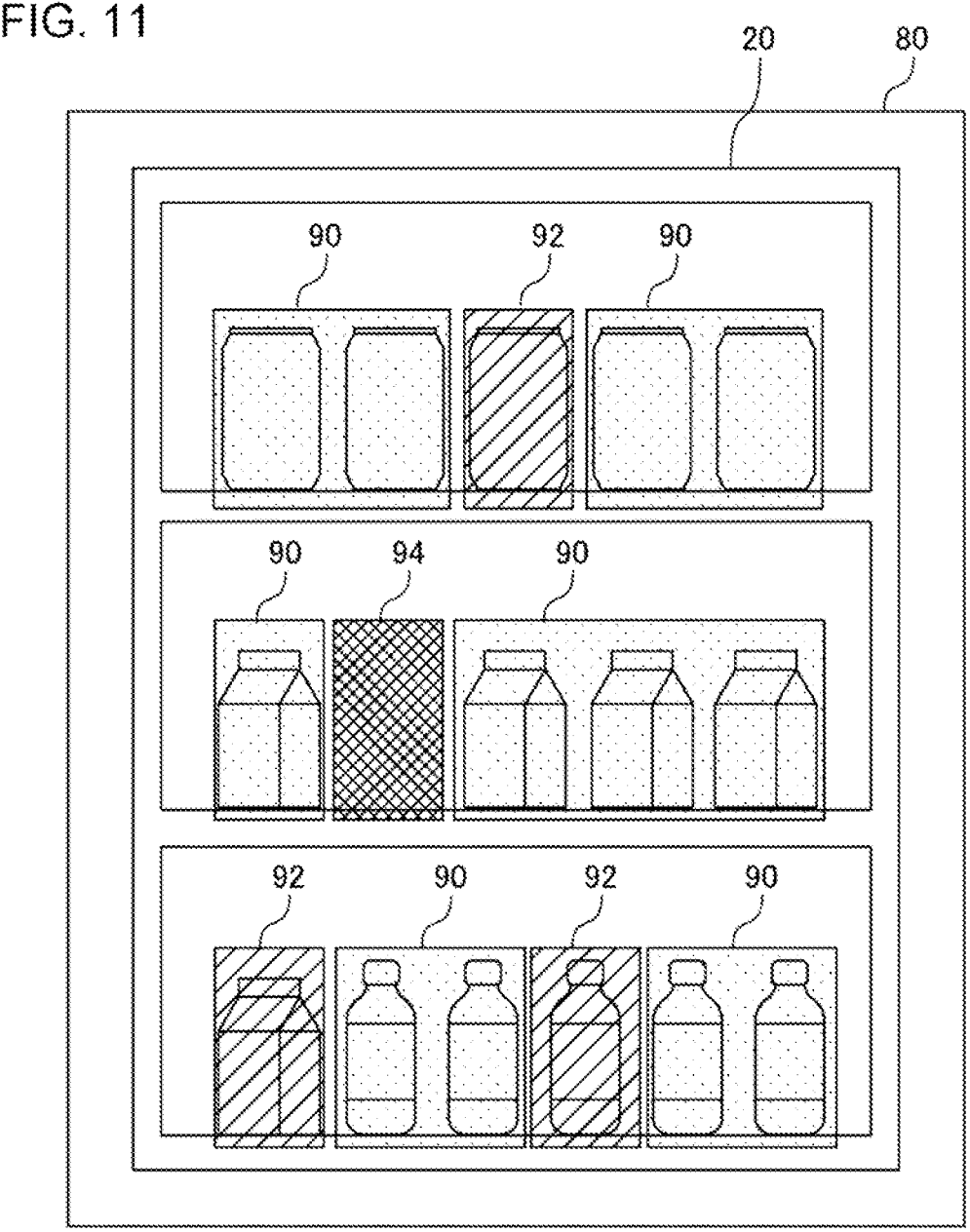
FIG. 11 is a first diagram illustrating a result image.

For example, the generation unit 2060 generates the result image by superimposing the superimposition data representing a result of the comparison of the actual display information with the reference display information on the shelf rack image 12. FIG. 11 is a first diagram illustrating the result image. In a result image 80 of FIG. 11, the superimposition data representing the result of the comparison is superimposed on the shelf rack image 12. Superimposition data 90 (a rectangular in a dot pattern) is superimposed on an image region of the product which matches the reference indicated in the reference display information. In addition, superimposition data 92 (a rectangle in an oblique pattern) is superimposed on an image region of a product which does not match the reference indicated in the reference display information. Further, superimposition data 94 (a rectangular in a lattice pattern) is superimposed on the image region (that is, the image region representing a position of a shortage of the product) representing a position where the product should be displayed according to the reference display information, among the image regions where the product is not displayed. For example, a case where although the reference display information indicates a position of "the second stage, the third row" as the position of the product A, no product is disposed at the position may be referred to as the shortage of the product at the position.

The superimposition data may use a color instead of a pattern such as the dot pattern. For example, instead of the dot pattern, the oblique pattern, and the lattice pattern, respectively, a green color, a red color, and a yellow color are used.

Here, the superimposition data (the superimposition data 92 or the superimposition data 94 in FIG. 11) representing a part that does not match the reference indicated in the reference display information may be emphasized using a method for blinking or the like.

Figure 12:
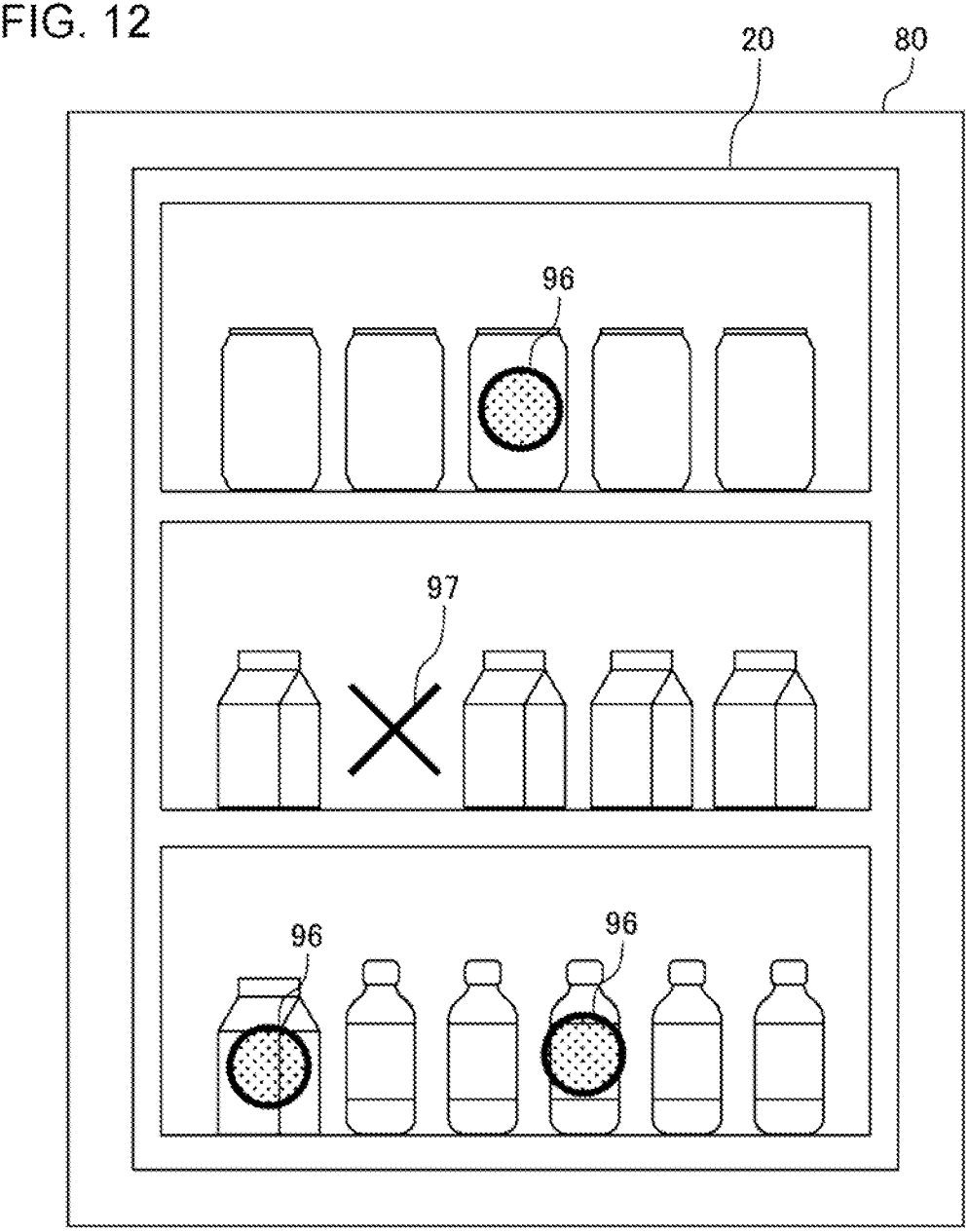
FIG. 12 is a second diagram illustrating the result image.

The product that matches the reference and the product that does not match the reference may be distinguished by a shape of the superimposition data instead of the pattern or the color of the superimposition data. FIG. 12 is a second diagram illustrating the result image 80. In the result image 80 of FIG. 12, superimposition data 96 (a black circle) is superimposed on an image region of the product which does not match the reference indicated in the reference display information. Further, superimposition data 97 (a cross) is superimposed on an image region representing the position of the shortage of the product.

Figure 13:
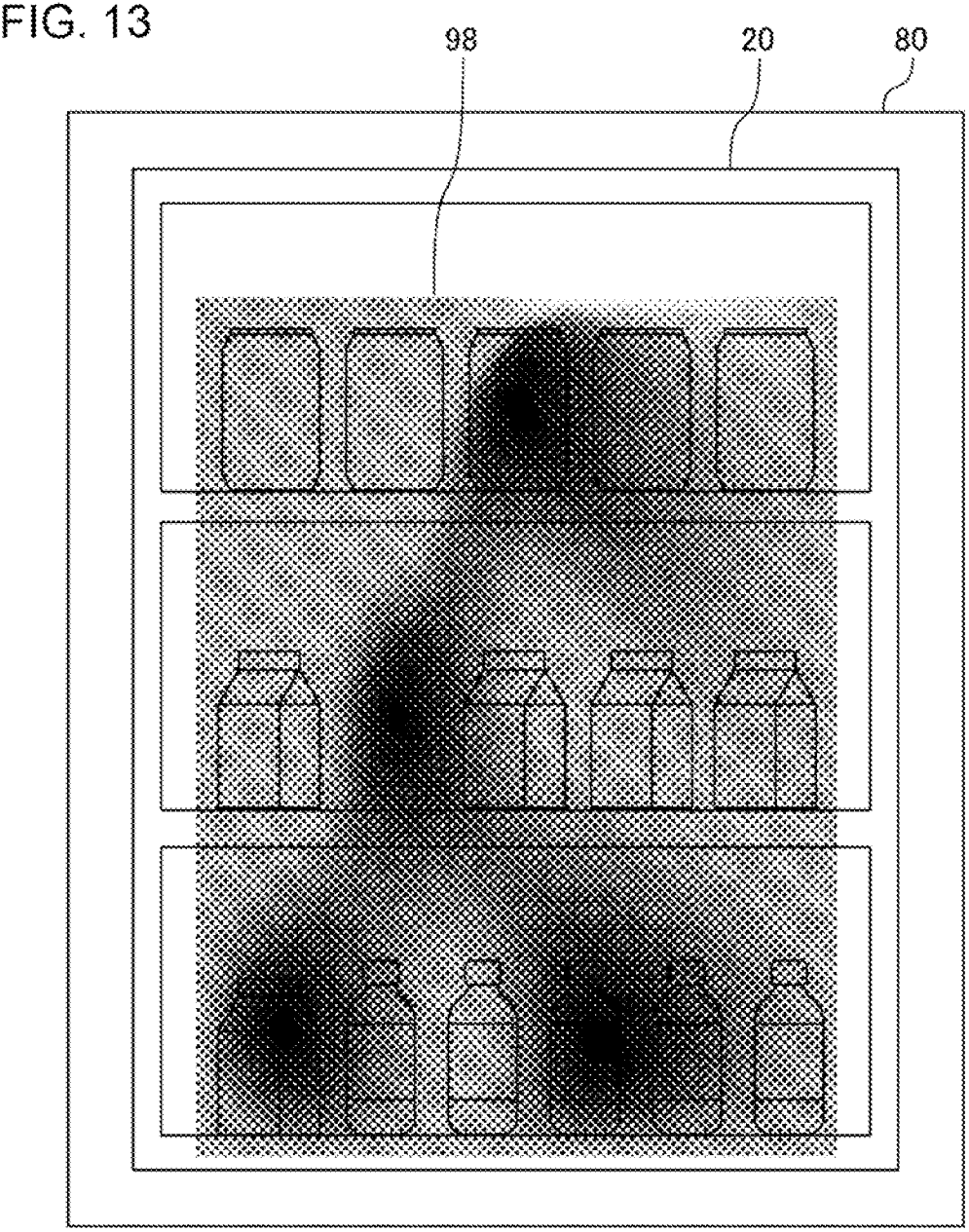
FIG. 13 is a third diagram illustrating the result image.

In addition, for example, a heat map may be used as the superimposition data. FIG. 13 is a third diagram illustrating the result image 80. In FIG. 13, one superimposition data 98 is superimposed on the shelf rack image 12. The superimposition data 98 is the heat map in which a color of a part that does not match the reference display information is relatively dark, and a color of a part that matches the reference display information is relatively light.

Figure 14:
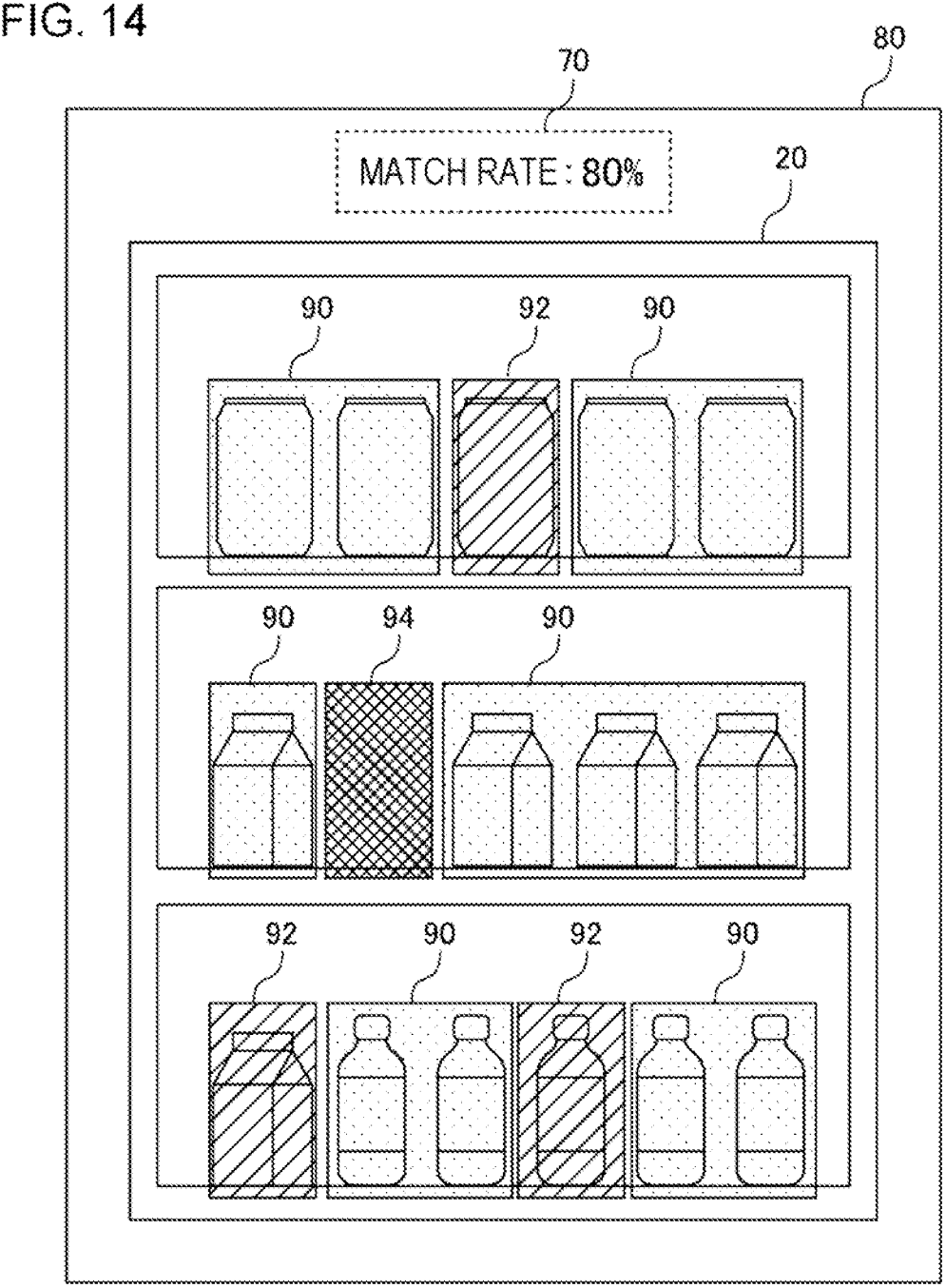
FIG. 14 is a diagram illustrating an example of the result image including a match rate for each shelf rack.

The result image 80 may include a character string or the like representing the match rate for each shelf rack, in addition to the shelf rack image 12 on which the superimposition data representing the result of the comparison is superimposed. FIG. 14 is a diagram illustrating the result image 80 including the match rate for each shelf rack. The result image 80 of FIG. 14 includes a character string 70 representing the match rate for each shelf rack on the shelf rack image 12.

Figure 15:
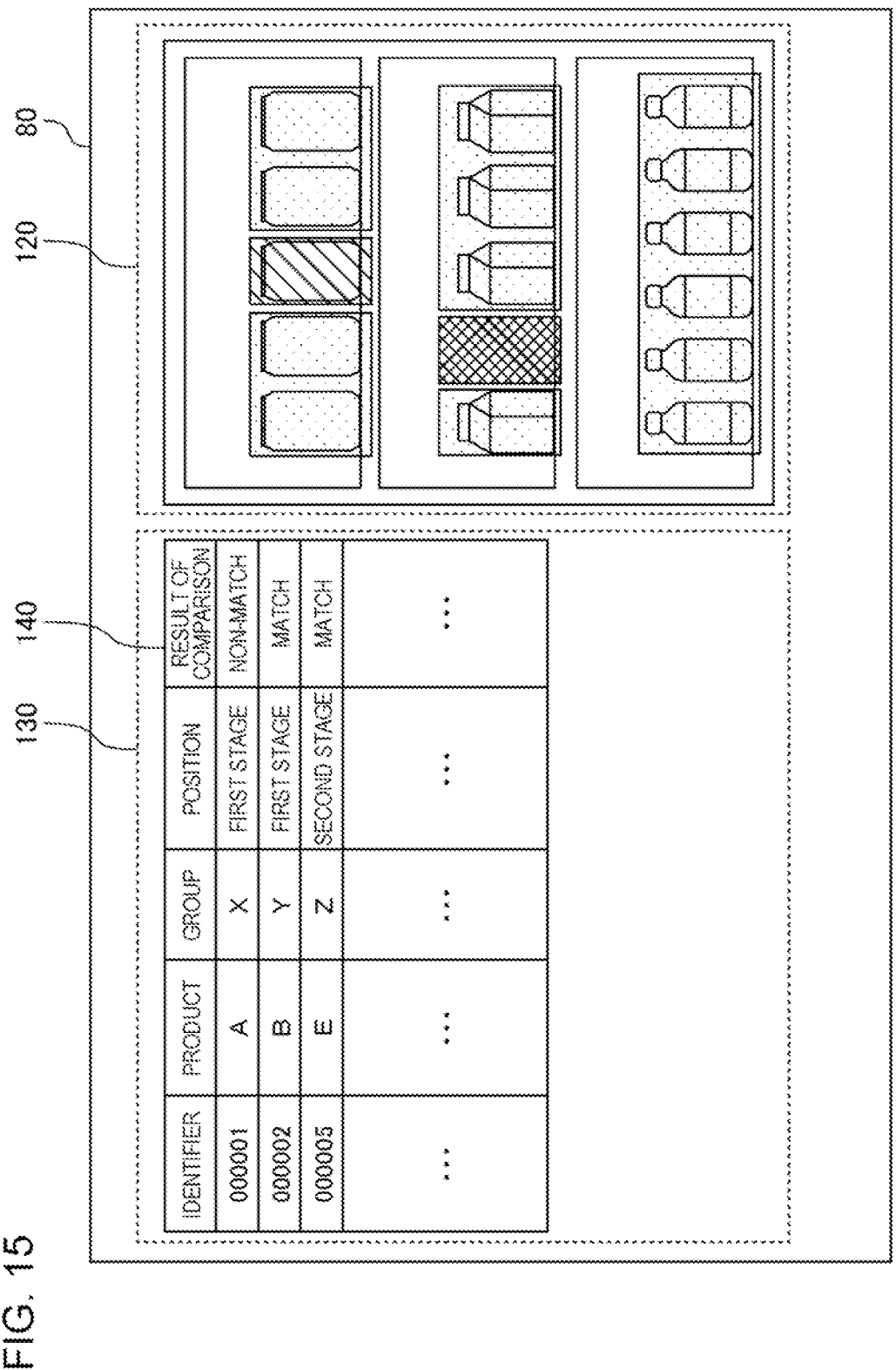
FIG. 15 is a diagram illustrating an example of the result image including a list of products.

The result image 80 may include a list of products displayed on the shelf rack image 12 in addition to the shelf rack image 12 on which the superimposition data representing the result of the comparison is superimposed. FIG. 15 is a diagram illustrating the result image 80 including the list of the products. In FIG. 15, the shelf rack image 12 on which the superimposition data is superimposed is displayed in an area 120. On the other hand, in the area 130, a product list 140 is displayed.

Here, in a case where the result image is displayed on the display apparatus, the generation unit 2060 may change the display of the area 120 according to an input operation performed by the user on the product list 140. For example, it is assumed that the user selects a certain record in the product list 140. In this case, the comparison unit 2040 is configured to emphasize an image region corresponding to a product indicated by the selected record in the area 120.

Figure 16:
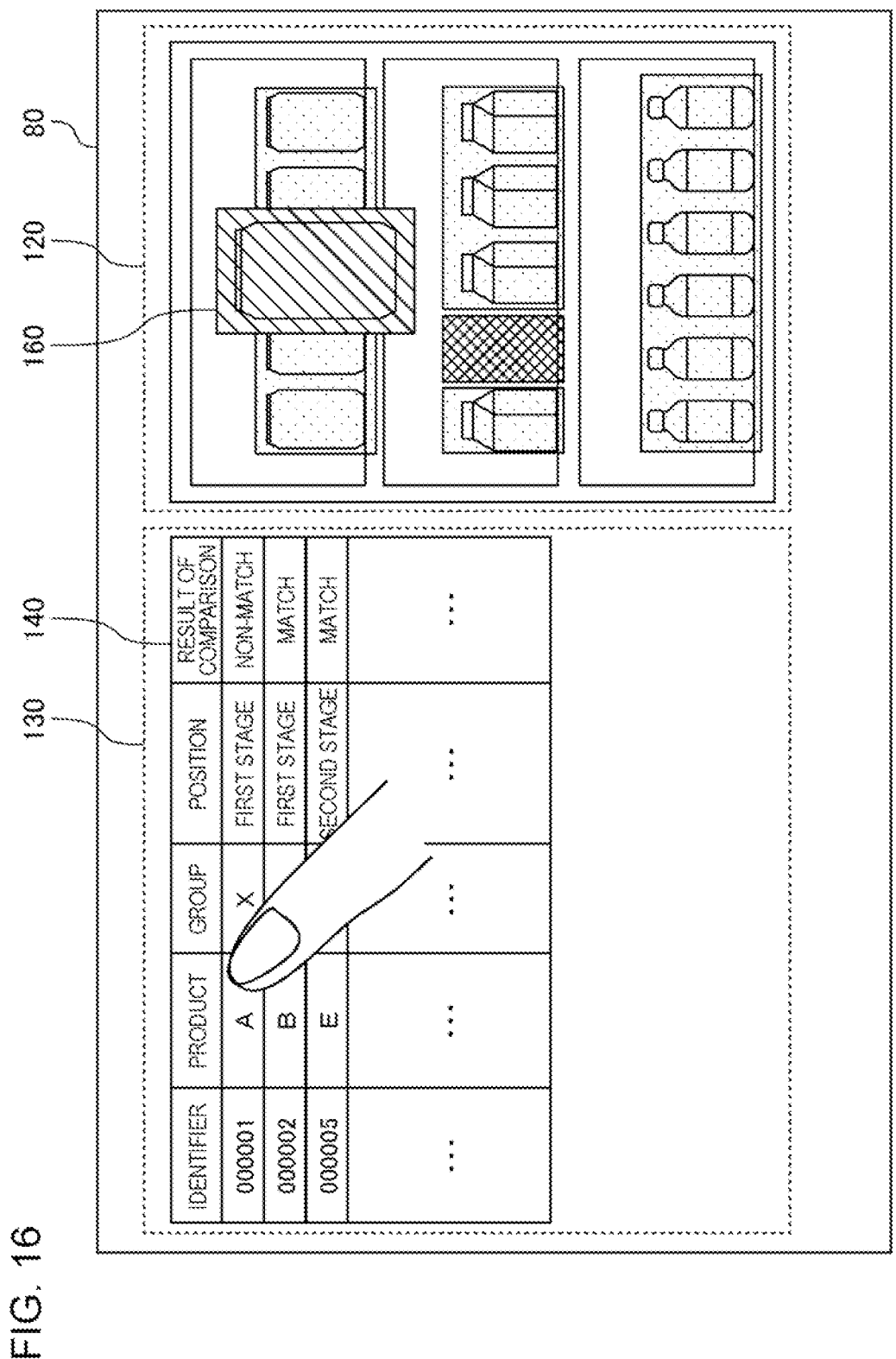
FIG. 16 is a diagram illustrating a state in which the result image changes according to an operation with respect to the list of the products.

FIG. 16 is a diagram illustrating a state in which the result image 80 changes according to an operation performed on the product list 140. In FIG. 16, it is assumed that the user adds an input operation of selecting a record of the product A on the result image 80 illustrated in FIG. 15. According to the input operation, superimposition data 160 is displayed on result image 80. The superimposition data 160 is acquired by extracting and enlarging an image region corresponding to the product A from the result image 80 of FIG. 15, and is displayed to be located in front of the shelf rack image 12. Therefore, the image region corresponding to the product A selected by the user is emphasized and viewed as being raised to the front. The operation of selecting the record is not limited to a touch operation, and may be a mouse operation or the like.

In contrast, the generation unit 2060 may change the display of the product list 140 according to the input operation performed by the user on the product image displayed in the area 120. Specifically, in a case where the user selects an image of a certain product, the record of the product list 140 representing the product is emphasized.

Figure 17:
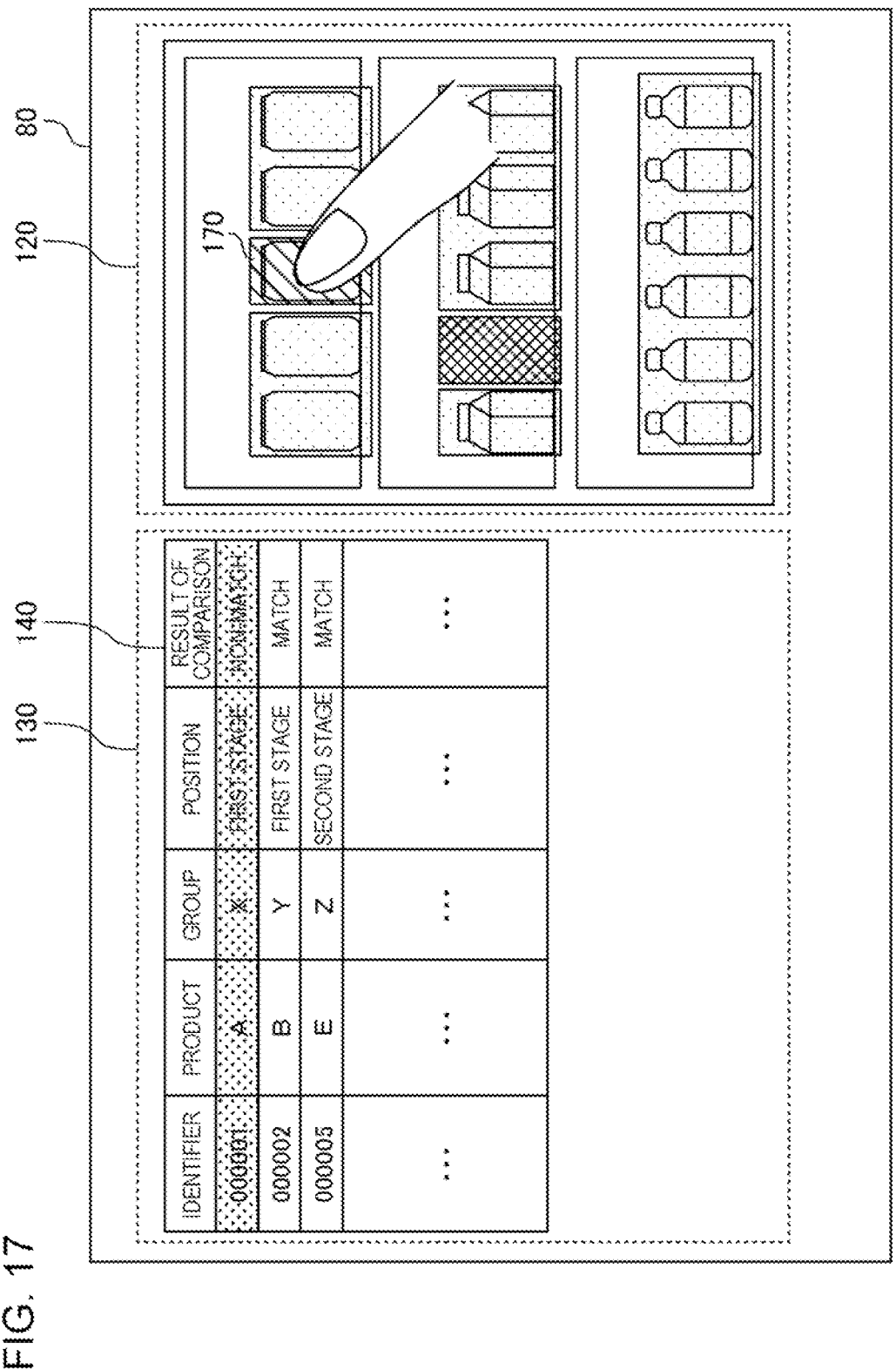
FIG. 17 is a diagram illustrating a state in which the result image changes according to an operation with respect to an image of the product.

FIG. 17 is a diagram illustrating a state in which the result image 80 changes according to the operation performed on the product image. In FIG. 17, a background color of a record representing the product A is changed according to a fact that the user selects the image region 170 representing the product A in the area 120.

<Method for Updating Display of Display Apparatus>

In a case where the display apparatus that displays the result image 80 is connected to a terminal other than the information processing apparatus 2000, an input operation with respect to the result image 80 is detected by the terminal. For example, in a case where the result image 80 is displayed on the display apparatus of the mobile terminal 3000, the input operation with respect to the result image 80 is detected by the mobile terminal 3000.

As described above, in a case where the input operation with respect to the result image 80 is detected by the terminal other than the information processing apparatus 2000, it is possible to use various methods as a method for updating display of the display apparatus according to the input operation. For example, a terminal that has detected the input operation with respect to the result image 80 transmits content of the input operation (for example, information relevant to the superimposition data that is a target of the input operation) to the information processing apparatus 2000. The information processing apparatus 2000 generates the result image 80 whose content is updated based on the received information, and transmits the result image 80 to the terminal. Then, the terminal displays the received result image 80 on the display apparatus. Through the series of flows, the result image 80 displayed on the display apparatus is updated.

In addition, for example, a terminal, such as the mobile terminal 3000, may have a function of updating the display of the display apparatus according to the input operation with respect to the result image 80. In this case, in a case where the terminal detects the input operation performed by the user, the terminal changes the result image 80 by itself without transmitting content of the input operation to the information processing apparatus 2000. In this case, an application for browsing the result image 80 is installed in the terminal in advance. For example, in a case of the mobile terminal 3000, the above-described application 100 has a function of browsing the result image 80.

<Case where Product that Cannot be Recognized from Shelf Rack Image 12 Exists>

There may be a case where it is not possible to recognize a part of the product included in the shelf rack image 12 because a part of the shelf rack image 12 is unclear. In this case, the actual display information may indicate a position where some undetermined products (unknown products) are placed.

Figure 18:
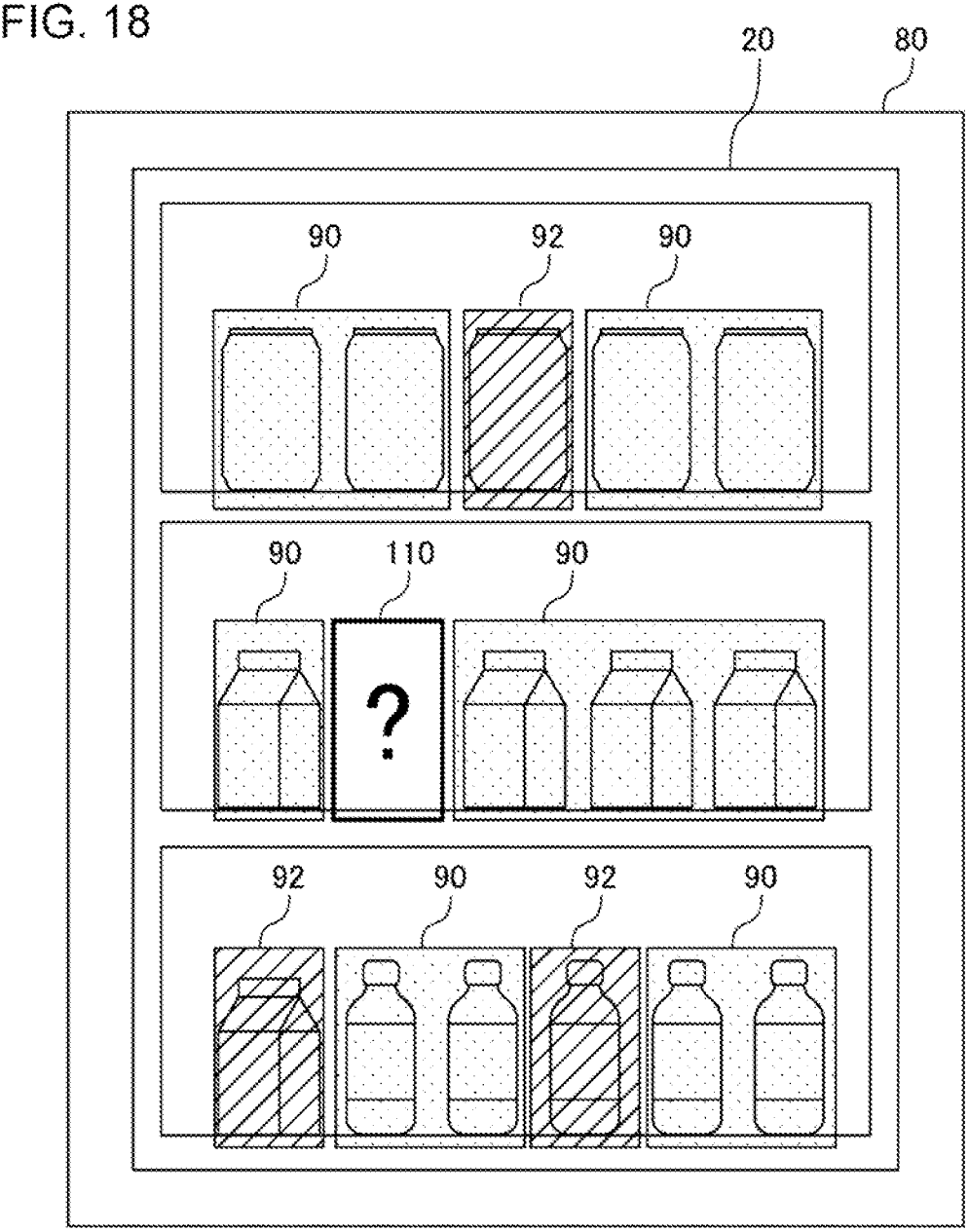
FIG. 18 is a diagram illustrating an example of the result image including superimposition data representing an unknown product.

In a case where the actual display information indicates a position of the unknown product, it is preferable that the result image 80 indicates the position of the unknown product. Specifically, the generation unit 2060 includes the superimposition data representing the unknown product in the result image 80. FIG. 18 is a diagram illustrating the result image 80 including the superimposition data representing the unknown product. In FIG. 18, the superimposition data 110 represents the unknown product. That is, the result image 80 of FIG. 18 represents that the product at the position where the superimposition data 110 is superimposed is not determined.

For the unknown product, it is preferable to perform imaging with the camera 10 again. Therefore, for example, the superimposition data 110 may be realized as a button for calling a camera function. In this case, for example, the result image 80 is displayed on the display apparatus of the mobile terminal 3000 provided with the camera 10. In this case, the application 100 detects a fact that the user presses the superimposition data 110, or the like, and in response thereto activates a camera application that controls the camera 10. In a case where the user operates the camera application to cause the camera 10 to perform imaging, the application 100 transmits the generated shelf rack image 12 to the information processing apparatus 2000. The information processing apparatus 2000 generates the actual display information again using the acquired shelf rack image 12.

Here, in a case where a product that was the unknown product is included to be recognizable (clear) in the newly generated shelf rack image 12, the product name or the like of the product that was the unknown product is indicated in the newly generated actual display information. Therefore, the information processing apparatus 2000 generates the comparison information again by comparing the newly generated actual display information with the reference display information, and updates the result image 80. At this time, the information processing apparatus 2000 may generate the comparison information only for the product that is the unknown product in the previously generated actual display information, and may merge the comparison information with the previously generated comparison information.

It should be noted that, a method for using the superimposition data 110 representing the unknown product is not limited to a method for performing imaging by the camera 10 again. For example, a configuration may be used in which the superimposition data 110 includes information relevant to a product to be placed at the position of the unknown product. A display aspect of the information relevant to the product may use the same configuration as the information (correction information 150-1 and correction information 150-2) illustrated in FIG. 19 which will be described later. In this case, it is possible to realize the information processing apparatus 2000 by obtaining information relevant to the product associated with the position of the unknown product from the reference display information. In a case where information relevant to the displayed product is selected by the user, the information processing apparatus 2000 may generate actual display information, which is different from the actual display information, again (that is, information relevant to the selected product is included in the actual display information) according to the selection based on the information relevant to the selected product and the actual display information generated using the shelf rack image 12 already acquired.

<Display of Information for Correcting Display of Product>

The result image 80 may include information representing the reference indicated in the reference display information (that is, information representing how to correct the display situation so as to match the reference) for the part that does not match the reference indicated in the reference display information. Hereinafter, the information is referred to as the correction information.

Figure 19:
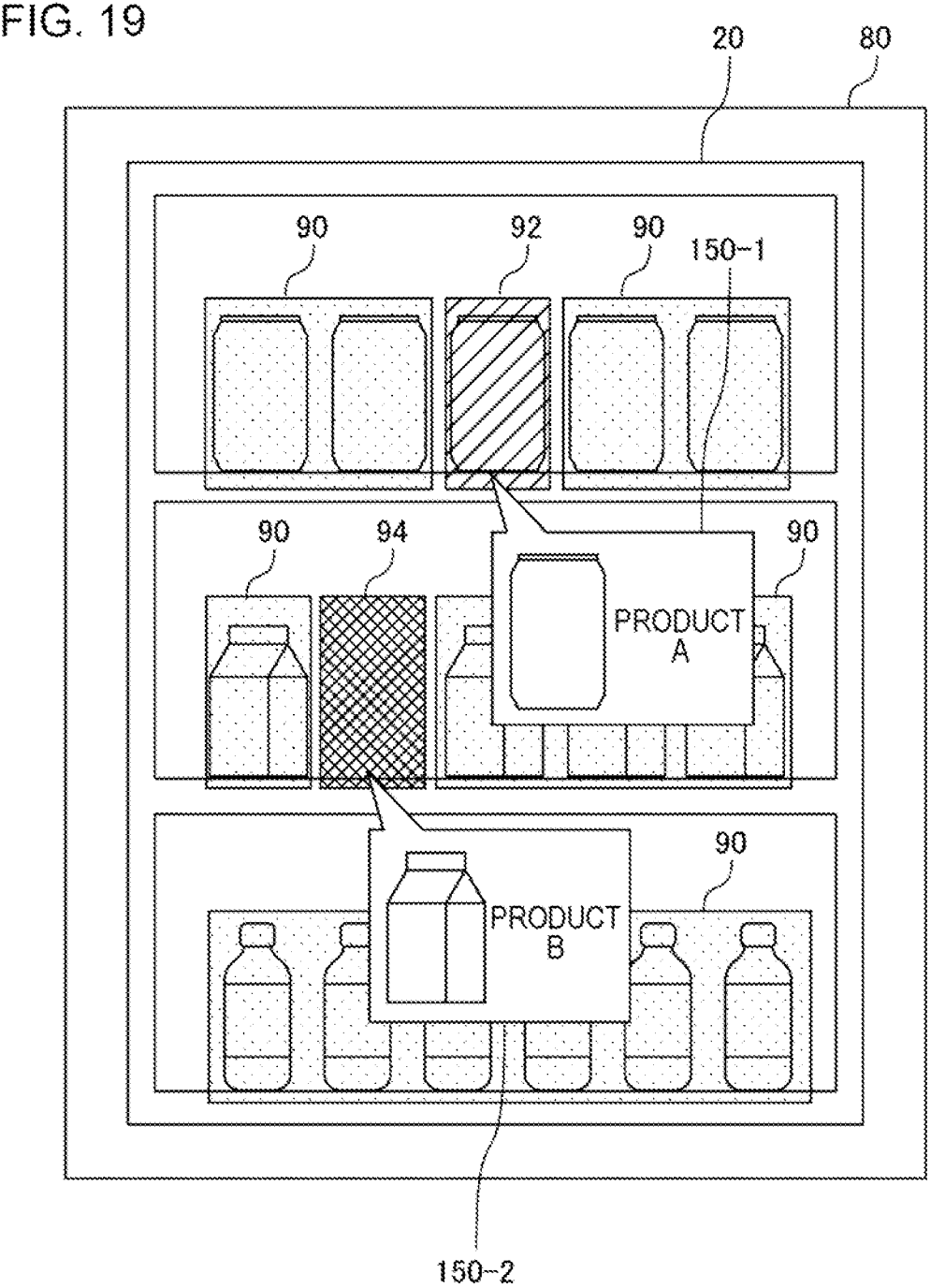
FIG. 19 is a diagram illustrating correction information.

FIG. 19 is a diagram illustrating the correction information. The result image 80 of FIG. 19 includes two pieces of correction information 150. When the correction information 150-1 is viewed, it is understood that a product placed at a position where the superimposition data 92 is superimposed should be replaced with the product A. Also, when the correction information 150-2 is viewed, it is understood that the product B should be placed in a place where the superimposition data 94 is superimposed.

Here, in a case where the result image 80 is displayed on the display apparatus, the generation unit 2060 may include the correction information 150 in the result image 80 from the beginning, or may include the correction information 150 in the result image 80 at the timing when the input operation is added with respect to the superimposition data (the superimposition data 92 and the superimposition data 94) which indicates not matching the reference.

In addition, the generation unit 2060 may generate the screen data representing detailed information relevant to the product indicated in the correction information 150 according to a fact that the input operation is added to the correction information 150. The information relevant to the product includes, for example, an identifier of the product, a group to which the product belongs, a manufacturer of the product, and a place where the product is stored (a place of a shelf rack installed in a warehouse and a position of the product on the shelf rack). For example, in a case of the shortage of the product, it is necessary to bring the product from a storage location and replenish the product. Thus, the storage location of the product is displayed, and thus it is possible to easily perform an operation of replenishing the product.

Here, the correction information 150 may be displayed for all products that do not match the reference indicated in the reference display information, or may be displayed for some products. In the latter case, whether or not to display the correction information 150 for a product is determined based on a degree of importance of the product. In this case, the degree of importance is set for each product in advance.

For example, the generation unit 2060 generates the correction information 150 only for products whose degree of importance is equal to or larger than a predetermined value, and includes the correction information 150 in the result image 80. In addition, for example, the generation unit 2060 may generate the correction information 150 only for a predetermined number of products at a high degree of importance among the products that do not match the reference indicated in the reference display information, and include the correction information 150 in the result image 80.

[Example of Hardware Configuration]

Similar to the first example embodiment, a hardware configuration of the computer that realizes the information processing apparatus 2000 according to the second example embodiment is illustrated in, for example, FIG. 3. However, the storage device 1080 of the computer 1000 that realizes the information processing apparatus 2000 of the example embodiment further stores a program module that realizes the functions of the information processing apparatus 2000 of the example embodiment.

Hereinabove, although the example embodiments of the present invention are described with reference to the accompanying drawings, the example embodiments are examples of the present invention, and it is possible to use a combination of the respective example embodiment or to use various configurations other than the above-described configurations.

Although a part or all of the above-described example embodiments may be described as the supplementary below, the present invention is not limited thereto.

1. An information processing apparatus including:
   an image analysis unit that performs image analysis on a shelf rack image in which a product shelf rack is captured, and generates actual display information representing a display situation of a product on the product shelf rack; and
   a comparison unit that compares the actual display information with reference display information representing a reference for display of the product on the product shelf rack, and generates comparison information representing a result of the comparison.

2. The information processing apparatus according to 1, in which the reference display information indicates identification information of each product to be displayed on the product shelf rack, and
   in which the image analysis unit generates the actual display information representing identification information of each product displayed on the product shelf rack.

3. The information processing apparatus according to 2, in which the reference display information indicates at least one of a display position of the product on the product shelf rack, a number of faces, and a disposition relationship with another product.

4. The information processing apparatus according to any one of 1 to 3, in which the comparison unit computes a match rate representing a degree at which the display situation of the product matches the reference indicated in the reference display information, and causes the match rate to be included in the comparison information.

5. The information processing apparatus according to any one of 1 to 3, in which the comparison unit acquires an identifier of a manufacturer, computes a match rate representing a degree at which a display situation of a product of the manufacturer determined by the identifier matches the reference indicated in the reference display information, and causes the match rate to be included in the comparison information.

6. The information processing apparatus according to any one of 1 to 5 further including a generation unit that generates a result image representing a product, which does not match the reference indicated in the reference display information, using the comparison information.

7. The information processing apparatus according to 6, in which the result image represents the product that does not match the reference indicated in the reference display information and a product that matches the reference indicated in the reference display information in a distinguishable aspect.

8. The information processing apparatus according to 6 or 7, in which the generation unit, for the product that does not match the reference indicated in the reference display information, causes correction information representing a position, at which the product is to be displayed, or a product to be displayed at the position at which the product is displayed, to be included in the result image.

9. An information processing system including an information processing apparatus and a mobile terminal,
in which the mobile terminal transmits a shelf rack image, in which a product shelf rack is captured, to the information processing apparatus, and
in which the information processing apparatus includes
an image analysis unit that receives the transmitted shelf rack image, performs image analysis on the shelf rack image, and generates actual display information representing a display situation of the product on the product shelf rack,
a comparison unit that compares the actual display information with reference display information representing a reference for display of the product on the product shelf rack, and generates comparison information representing a result of the comparison, and
a generation unit that generates a result image representing a product which does not match the reference indicated in the reference display information, and transmits the generated result image to the mobile terminal, and
in which the mobile terminal receives the result image and displays the result image on a display apparatus.

10. The information processing system according to 9, in which the reference display information generates the actual display information which indicates at least one of a display position of the product on the said product shelf rack, a number of faces, and a disposition relationship with another product.

11. The information processing system according to 10, in which reference display information indicates the display position of the product on the product shelf rack, a number of faces, or the disposition relationship with another product.

12. The information processing system according to any one of 9 to 11, in which the comparison unit computes a match rate representing a degree at which the display situation of the product matches the reference indicated in the reference display information, and causes the match rate to be included in the comparison information.

13. The information processing system according to any one of 9 to 11, in which the comparison unit acquires an identifier of a manufacturer, computes a match rate representing a degree at which a display situation of a product of the manufacturer determined by the identifier matches the reference indicated in the reference display information, and causes the match rate to be included in the comparison information.

14. The information processing system according to any one of 9 to 13, in which the result image represents the product that does not match the reference indicated in the reference display information and a product that matches the reference indicated in the reference display information in a distinguishable aspect.

15. The information processing system according to any one of 9 to 14, in which the generation unit, for the product that does not match the reference indicated in the reference display information, causes correction information representing a position, at which the product is to be displayed, or a product to be displayed at the position at which the product is displayed, to be included in the result image.

16. A control method executed by a computer, the method including:
an image analysis step of performing image analysis on a shelf rack image in which a product shelf rack is captured, and generating actual display information representing a display situation of a product on the product shelf rack; and
a comparison step of comparing the actual display information with reference display information representing a reference for display of the product on the product shelf rack, and generating comparison information representing a result of the comparison.

17. The control method according to 16, in which the reference display information indicates identification information of each product to be displayed on the product shelf rack, and
in which the image analysis step includes generating the actual display information representing identification information of each product displayed on the product shelf rack.

18. The control method according to 17, in which the reference display information indicates at least one of a display position of the product on the product shelf rack, a number of faces, and a disposition relationship with another product.

19. The control method according to any one of 16 to 18, in which the comparison step includes comparing includes computing a match rate representing a degree at which the display situation of the product matches the reference indicated in the reference display information, and causing the match rate to be included in the comparison information.

20. The control method according to any one of 16 to 18, in which the comparison step includes acquiring an identifier of a manufacturer, computing a match rate representing a degree at which a display situation of a product of the manufacturer determined by the identifier matches the reference indicated in the reference display information, and causing the match rate to be included in the comparison information.

21. The control method according to any one of 16 to 20, further including a generation step of generating a result image representing a product, which does not match the reference indicated in the reference display information, using the comparison information.

22. The control method according to 21, in which the result image represents the product that does not match the reference indicated in the reference display information and a product that matches the reference indicated in the reference display information in a distinguishable aspect.

23. The control method according to 21 or 22, in which the generation step, for the product that does not match the reference indicated in the reference display information, includes causing correction information representing a position, at which the product is to be displayed, or a product to be displayed at the position at which the product is displayed, to be included in the result image.

24. A program for causing a computer to execute respective steps of the control method according to any one of 16 to 23.

The invention claimed is:

1. An information processing apparatus comprising:
at least one memory configured to store instructions; and
at least one processor configured to execute the instructions to:
generate actual display information representing a display situation of a particular product on a product shelf rack, based on image analysis of a shelf rack image of the product shelf rack captured by a camera;
perform a comparison of the actual display information with reference display information representing a reference for display of each product on the product shelf rack;
generate a result image representing a non-compliant product and a product in shortage in a distinguishable aspect, using a result of the comparison, the non-compliant product not matching the reference for display of each product on the product shelf rack indicated in the reference display information; and
generate the result image representing the non-compliant product and the product in shortage in a superimposed aspect that differs in at least one of patterns, colors, and shapes.

2. The information processing apparatus according to claim 1,
wherein the at least one processor is further configured to execute the instructions to generate the result image representing an unknown product not recognized in the image analysis.

3. The information processing apparatus according to claim 1,
wherein the at least one processor is further configured to execute the instructions to compute a match rate representing a degree at which the display situation of the particular product on the product shelf rack matches the reference for display of each product on the product shelf rack indicated in the reference display information.

4. The information processing apparatus according to claim 3,
wherein the at least one processor is further configured to execute the instructions to generate the result image by superimposing, on the shelf rack image, superimposition data using a heat map in which a color of a part that does not match the reference display information is relatively dark, and a color of a part that matches the reference display information is relatively light.

5. The information processing apparatus according to claim 3,
wherein the result image includes a character string representing the match rate for the product shelf rack and the shelf rack image on which superimposition data representing the result of the comparison is superimposed.

6. The information processing apparatus according to claim 1,
wherein the at least one processor is further configured to execute the instructions to:
acquire an identifier of a manufacturer, compute a second match rate representing a degree at which a display situation of a product of the manufacturer determined by the identifier matches the reference for display of each product on the product shelf rack indicated in the reference display information, and
cause the second match rate to be included in the comparison information.

7. The information processing apparatus according to claim 1,
wherein the at least one processor is further configured to execute the instructions to, for the non-compliant product, cause correction information representing a corrected position, at which the non-compliant product is to be displayed, or a replacement product to be displayed at a current position at which the non-compliant product is displayed, to be included in the result image.

8. An information processing system comprising:
an information processing apparatus; and
a mobile terminal,
wherein the mobile terminal transmits a shelf rack image, in which a product shelf rack is captured by a camera, to the information processing apparatus,
wherein the information processing apparatus comprises at least one memory configured to store instructions; and
at least one processor configured to execute the instructions to:
generate actual display information representing a display situation of a particular product on the product shelf rack, based on image analysis of the shelf rack image of the product shelf rack;
perform a comparison of the actual display information with reference display information representing a reference for display of each product on the product shelf rack;
generate a result image representing a non-compliant product and a product in shortage in a distinguishable aspect, using a result of the comparison, the non-compliant product not matching the reference for display of each product on the product shelf rack indicated in the reference display information; and
generate the result image representing the non-compliant product and the product in shortage in a superimposed aspect that differs in at least one of patterns, colors, and shapes.

9. A control method executed by a computer, the control method comprising:
generating actual display information representing a display situation of a particular product on a product shelf rack, based on image analysis of a shelf rack image of the product shelf rack captured by a camera;
performing a comparison of the actual display information with reference display information representing a reference for display of each product on the product shelf rack;
generating a result image representing a non-compliant product and a product in shortage in a distinguishable aspect, using a result of the comparison, the non-compliant product not matching the reference for display of each product on the product shelf rack indicated in the reference display information; and
generating the result image representing the non-compliant product and the product in shortage in a superimposed aspect that differs in at least one of patterns, colors, and shapes.

* * * * *